(12) United States Patent
Mannila et al.

(10) Patent No.: US 6,920,453 B2
(45) Date of Patent: Jul. 19, 2005

(54) METHOD AND SYSTEM FOR FINDING A QUERY-SUBSET OF EVENTS WITHIN A MASTER-SET OF EVENTS

(75) Inventors: Heikki Mannila, Espoo (FI); Dmitry Rusakov, Jerusalem (IL)

(73) Assignee: Nokia Corporation, Espoo (FI)

( * ) Notice: Subject to any disclaimer, the term of this patent is extended or adjusted under 35 U.S.C. 154(b) by 305 days.

(21) Appl. No.: 10/038,846

(22) Filed: Dec. 31, 2001

(65) Prior Publication Data

US 2003/0130967 A1 Jul. 10, 2003

(51) Int. Cl.$^7$ ............................................. G06F 17/30
(52) U.S. Cl. ............................................. 707/6; 707/100
(58) Field of Search ........................ 707/6, 3, 2, 100

(56) References Cited

U.S. PATENT DOCUMENTS

| | | | | |
|---|---|---|---|---|
| 5,713,016 A | * | 1/1998 | Hill ............................... | 707/5 |
| 5,809,499 A | | 9/1998 | Wong et al. .................... | 707/6 |
| 6,032,167 A | | 2/2000 | Takatsu ........................ | 708/424 |
| 6,134,541 A | * | 10/2000 | Castelli et al. ................. | 707/2 |
| 6,189,005 B1 | * | 2/2001 | Chakrabarti et al. ............ | 707/6 |
| 6,230,064 B1 | | 5/2001 | Nakase et al. ................. | 700/90 |
| 6,263,334 B1 | * | 7/2001 | Fayyad et al. ................. | 707/5 |
| 6,470,333 B1 | * | 10/2002 | Baclawski ....................... | 707/3 |

OTHER PUBLICATIONS

Kaski, Dimensionality Reduction by Random Mapping: Fast Similarity Computation for Clustering, Neural Networks Proceedings, 1998. IEEE World Congress on Computational Intelligence. IEEE International Joint Conference on, vol. 1, May 1998, p. 413–418.*

T. Kohonen et al, "Self Organization of a Massive Document Collections", IEEE Transactions on Neutral Networks, vol. 11, No. 3, May 2000.

* cited by examiner

Primary Examiner—Greta Robinson
(74) Attorney, Agent, or Firm—Harrington & Smith, LLP

(57) ABSTRACT

A method and system for determining similarity between a first event set, the first event set including a first plurality of event types, and a second event set, the second event set including a second plurality of event types, is provided. Observed events are randomly mapped to a multidimensional vector-Q and query events are mapped to a multidimensional query vector-q. Comparison of the vectors for a predetermined similarity according to: $\|Q-q\| \leq SV$, where SV=a predetermined similarity value determines similarity.

48 Claims, 20 Drawing Sheets

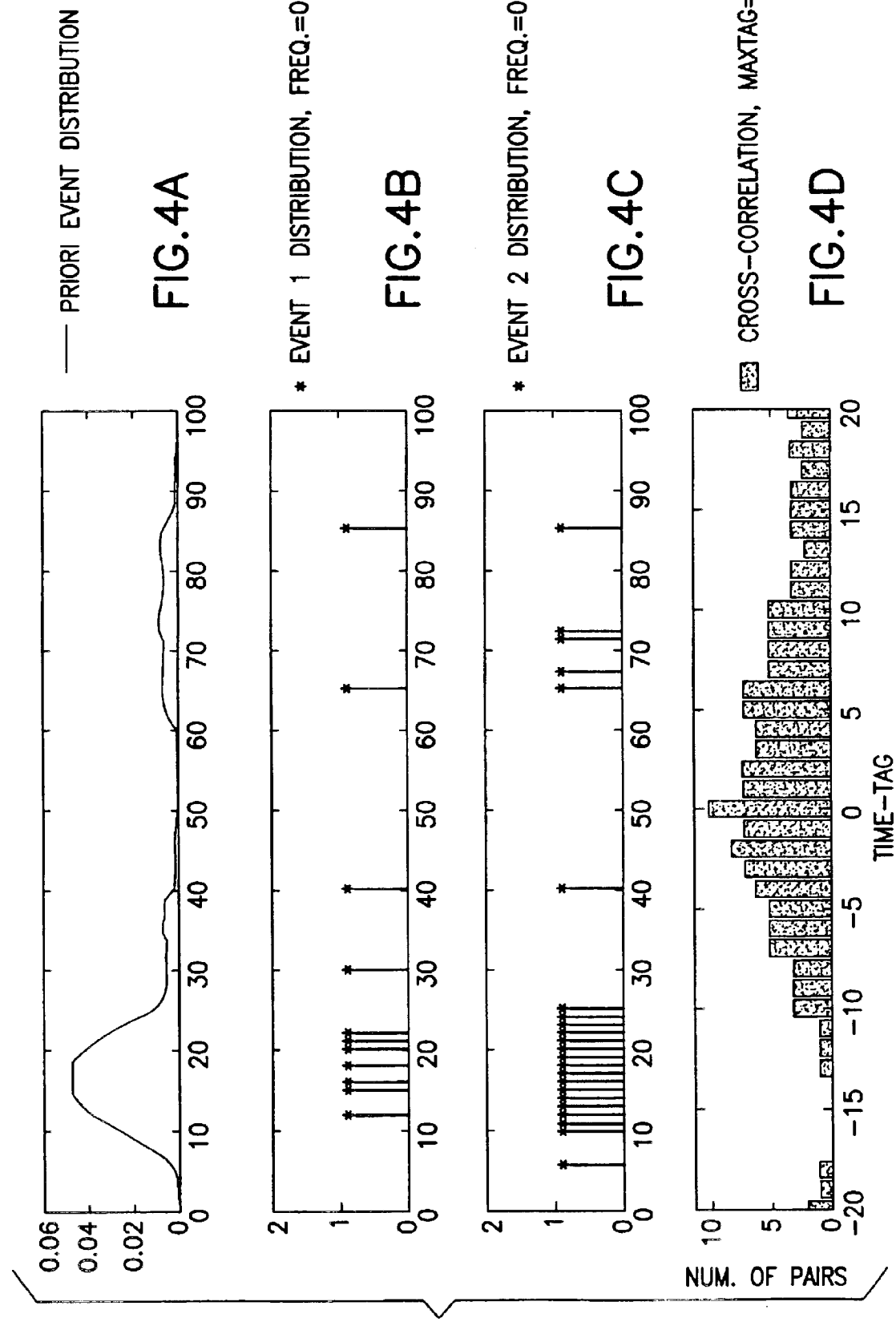

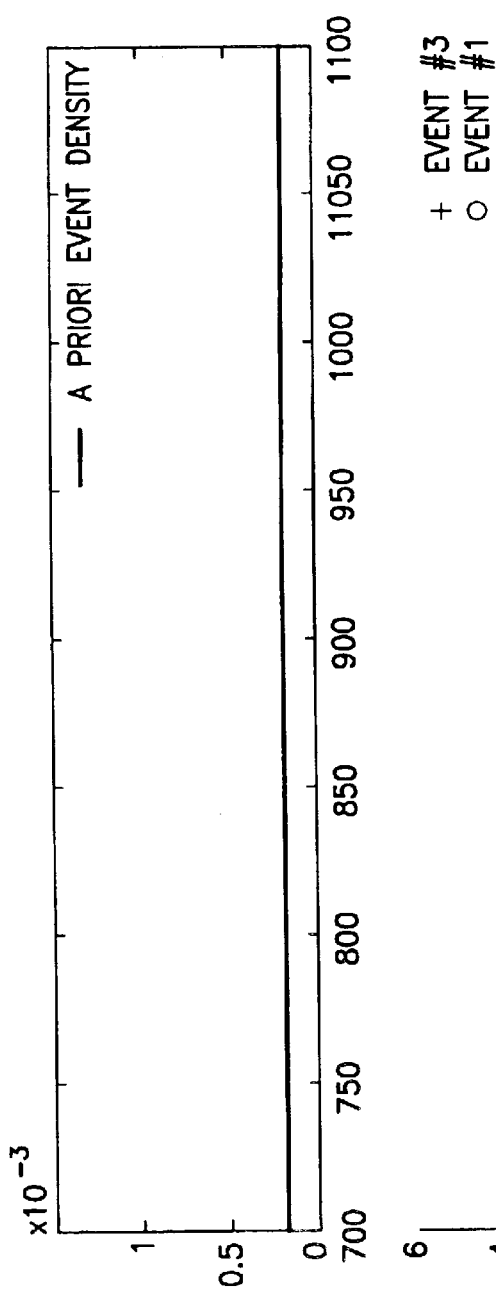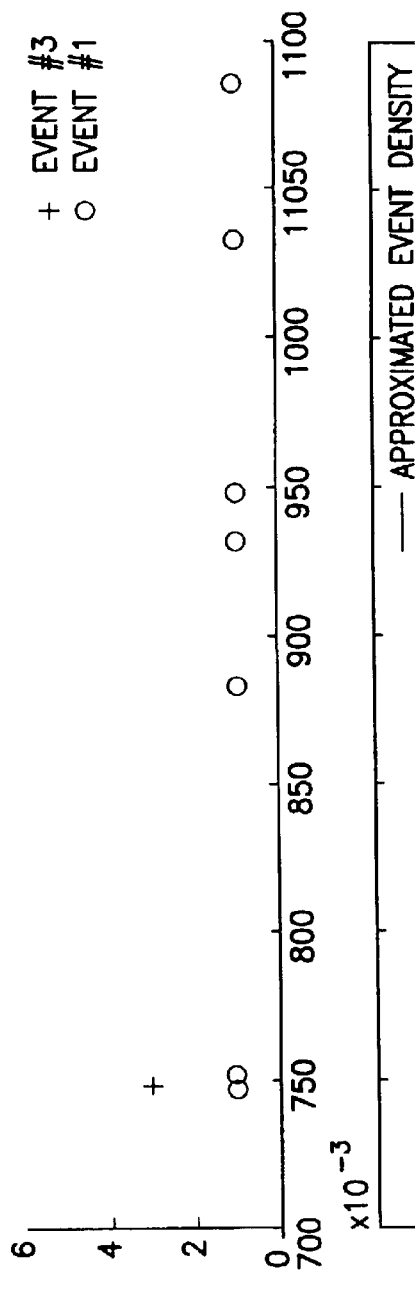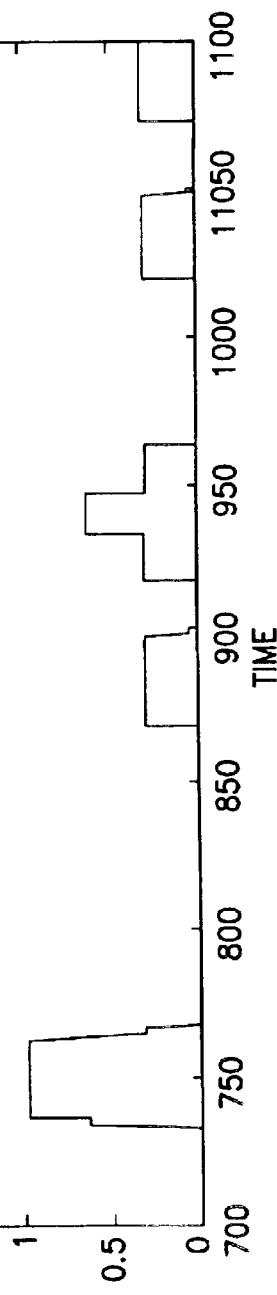

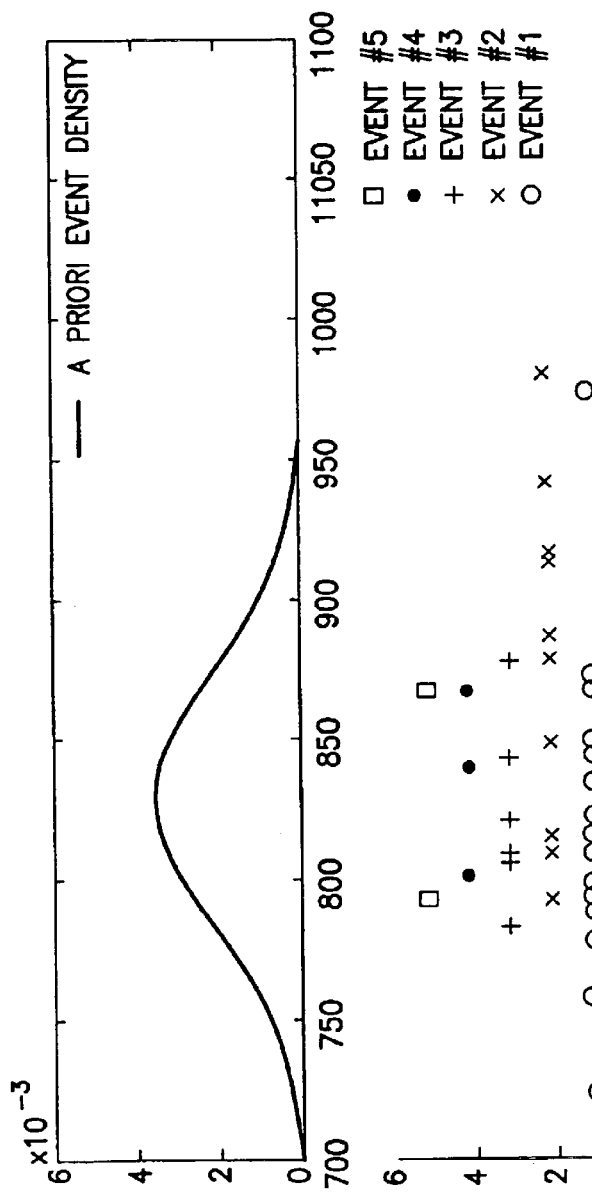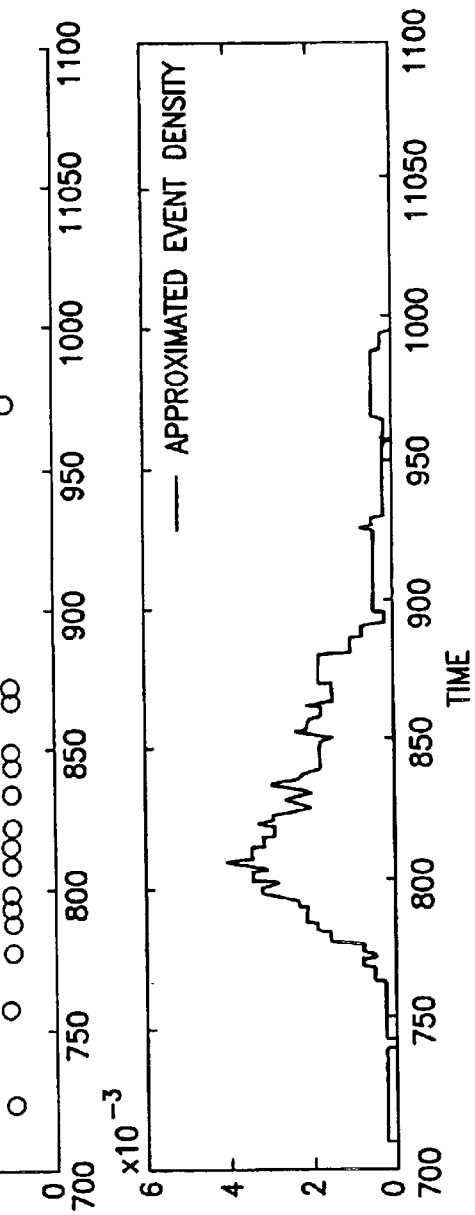
FIG.6B1 A PRIORI EVENT DENSITY
FIG.6B2 EVENT #5, EVENT #4, EVENT #3, EVENT #2, EVENT #1
FIG.6B3 APPROXIMATED EVENT DENSITY THE LOCATION OF THE CLOSEST SLICE TO THE QUERY SLICE, FOR EVERY 10th EVENT IN THE SEQUENCE AND FOR W-1000sec

| DIST | WINDOW | CLOSEST | OFFSET |
|---|---|---|---|
| 8.11 | 1675060 | 1675440 | -380 |
| 8.41 | 3014113 | 3014260 | -147 |
| 8.57 | 2799882 | 2800050 | -168 |
| 8.58 | 979102 | 979249 | -147 |
| 9.32 | 1193557 | 1193460 | 97 |
| 10.18 | 818800 | 818590 | 210 |
| 10.26 | 2639124 | 2639390 | -266 |
| 10.42 | 1942820 | 1943200 | -380 |
| 10.49 | 2853333 | 2853600 | -267 |
| 11.02 | 2478783 | 2478730 | 53 |
| 11.02 | 1889383 | 1889650 | -267 |
| 11.33 | 2103614 | 2103860 | -246 |
| 12.17 | 2692793 | 2692940 | -147 |
| 12.41 | 1835763 | 1836100 | -337 |
| 12.91 | 2906893 | 2907160 | -267 |

FIG.17A

| DIST | WINDOW | CLOSEST | OFFSET |
|---|---|---|---|
| 0.00 | 1461230 | 1461230 | EXACT |
| 0.00 | 2157420 | 2157420 | EXACT |
| 0.00 | 1032800 | 1032800 | EXACT |
| 1.02 | 2210970 | 2210970 | EXACT |
| 1.26 | 497272 | 497272 | EXACT |
| 1.32 | 711484 | 711484 | EXACT |
| 2.10 | 872143 | 872143 | EXACT |
| 2.59 | 3067820 | 3067820 | EXACT |
| 3.55 | 1568330 | 1568330 | EXACT |
| 3.61 | 2425180 | 2425180 | EXACT |
| 3.68 | 604378 | 604378 | EXACT |
| 4.00 | 657931 | 657931 | EXACT |
| 4.04 | 1247010 | 1247010 | EXACT |
| 4.55 | 1300570 | 1300570 | EXACT |
| 4.57 | 925696 | 925696 | EXACT |

| | | | | | |
|---|---|---|---|---|---|
| 4.57 | 3121370 | 3121370 | EXACT | 13.14 | 2264140 | 2264520 | -380 |
| 4.58 | 1086360 | 1086360 | EXACT | 13.75 | 3059438 | | MISSED |
| 4.79 | 2532290 | 2532290 | EXACT | 13.77 | 1428734 | | MISSED |
| 5.27 | 1407670 | 1407670 | EXACT | 14.08 | 2959387 | | MISSED |
| 5.64 | 2371432 | 2371630 | -198 | 14.17 | 755127 | | MISSED |
| 5.70 | 1139910 | 1139910 | EXACT | 14.43 | 1961635 | | MISSED |
| 5.82 | 2585840 | 2585840 | EXACT | 14.59 | 2053796 | | MISSED |
| 6.13 | 1354120 | 1354120 | EXACT | 14.88 | 1729345 | 1728990 | 355 |
| 7.17 | 1621733 | 1621880 | -147 | 15.01 | 1116290 | | MISSED |
| 7.95 | 1996493 | 1996760 | -267 | 15.26 | 2087183 | | MISSED |

DIST = DISTANCE TO QUERY WINDOW
WINDOW = POSITION (TIME) OF WINDOW FOUND
CLOSEST = POSITION OF CLOSEST TARGET WINDOW, IF CLOSER THAN 1000
OFFSET = DIFFERENCE OF THIS WINDOW AND CLOSEST TARGET

FIG.17B

METHOD AND SYSTEM FOR FINDING A QUERY-SUBSET OF EVENTS WITHIN A MASTER-SET OF EVENTS

BACKGROUND OF THE INVENTION

1. Field of the Invention

The present invention relates to generally to data matching and, more particularly, to event sequence matching.

2. Prior Art

Monitoring a large telecommunication network can result in an extensive log of alarms or other events of different types that occurred in the system. Similar log files may also be produced in mobile commerce systems, in web applications, and in mobile services. Such logs, or event sequences, generally consist of pairs (e,t), where e is an event type and t is the occurrence time of the event.

The sequences of events in a data flow can be, for example, sequences of events (alarms) with their corresponding occurrence times in a telecommunications network. The purpose of finding similar situations in these sequences of events, as in many other data analysis applications, is to predict events and to understand the dynamics of the process producing the sequence. In these applications similarity finding can help to customise individual services or interfaces by prediction and regularities based on previous behaviour.

The problem of finding similar situations can be described as follows. With a sequence of events $S=(<e_1,t_1>, \ldots ,(e_n,t_n>)$ and a time t and a window width w, find another time s, such that the subsequences of S, defined as the subsequences of events of S occurring in the half-open intervals (t−w,t) and (s−w,s] respectively, from here on called slices S(t,w) and S(s,w) of S, are similar. The slices are sequences of events. The similarity between two slices can be defined using an edit distance notion, i.e. the distance is defined as the cost of the cheapest possible sequence of operations that transforms one slice to another. The operations are insertion and deletion of an event and moving an event in time and each operation has an associated cost. The edit distance can be computed using known dynamic programming algorithm.

Prior art solutions for finding similar situations using known dynamic programming algorithms are computationally slow in time because of the high computational complexity of these algorithms. Furthermore, assigning costs to the edit operations is quite problematic as disclosed in "Pirjo Moen. Attribute, Event Sequence and Event Type Similarity Notions for Data Mining. PhD thesis, University of Helsinki, Department of Computer Science, Finland, February 2000". In prior art practices, there has also been considerable interest in defining intuitive and easily computable measures of similarity between complex objects and in using abstract similarity notions in querying databases as disclosed in: [1] Gautam Das, Heikki Mannila and Pirjo Ronkainen, "Similarity of attributes by external probes", in Proceedings of the 4th International Conference on Knowledge Discovery and Data Mining (KDD), pages 23–29, 1998; [2] E. -H. Han, G. Karypis, V. Kumar and B. Mobasher, "Clustering based on association rule hypergraphs", in Workshop on Research Issues on Data Mining and Knowledge Discovery, 1997; [3] H. V. Jagadish, A. O. Mendelzon and T. Milo, "Similarity-based queries", in Proceedings of the 14th Symposium on Principles of Database Systems (PODS), pages 36–45, 1995; [4] A. J. Knobbe and P. W. Adriaans, "Analyzing binary associations", in Proceedings of the 2nd International Conference on Knowledge Discovery and Data Mining (KDD), pages 311–314, 1996; [5] Y. Karov and S. Edelman, "Similarity-based word sense disambiguation", in Computational Linguistics, 24(1): 41–59, 1998; and [7] D. A. White and R. Jain, "Algorithms and strategies for similarity retrieval", in Technical Report VCL-96-101, Visual Computing Laboratory, UC Davis, 1996.

With ever increasing amounts of information surrounding us in our every day life and the numerous applications, services, etc., of which the quality relies on data processing, faster and more reliable methods for information retrieval, and for yielding added value from data, are needed to make better or even new applications, services, etc. possible. In many fields of applications, time series or ordered sets of data are an advantageous way of modelling data for many valuable end results.

Therefore, it is desirable to provide a method and system to efficiently analyze large amounts of data.

SUMMARY OF THE INVENTION

The foregoing and other problems are overcome, and other advantages are realized, in accordance with the presently preferred embodiments of these teachings.

In the present invention, a simple and fast method of mapping a sequence of time series data or ordered data into points in a k-dimensional Euclidian space is introduced. Furthermore it is shown how the mapping can be used as pre-processing for finding similar sequences in an effective way for retrieving useful information from previous sequences of events that resemble a specified sequence of events, predicting future events based on similarities between previous sequences of events and a current sequence of events in a data flow, looking for patterns or regularities in data, etc.

The present invention relates to a method for finding similarities in sequences of events in a data flow including means for retrieving useful information from previous sequences of events that resemble a specified query sequence of events. The present invention relates also to a method for finding similarities in sequences of events in a data flow including means for predicting future events in a data flow based on similarities between previous sequences of events in the data flow and current sequences of events in the data flow. The present invention furthermore relates to a method for data mining and information retrieval comprising means for looking for patterns or regularities in data.

In accordance with one embodiment of the invention, a method for determining similarity between a first event set, the first event set comprising a first plurality of event types, and a second event set, the second event set comprising a second plurality of event types, is provided. The method includes steps of mapping an observed event set to a multidimensional vector-Q and mapping a query event set to a multidimensional query vector-q. The next step is a comparison of the vectors for a predetermined similarity according to: $\|Q-q\| \leq SV$, where SV=a predetermined similarity value.

In accordance with another embodiment of the invention a method of finding a query-subset of events within an event set is provided. The event set includes a stream of ordered events, each ordered event corresponding to an event type e from a set of event types E. The method includes the steps of dividing the stream of ordered events into a plurality of segments and mapping each of the plurality of segments to a corresponding dimensional segment-vector. The next step maps the query-subset of events to a dimensional query-vector; and then compares the dimensional query-vector with at least one of the dimensional segment-vectors, and as a result of the comparison, makes a determination whether the query-vector is similar to the compared segment-vector.

In accordance with one embodiment of the present invention, a system for finding a query-set of events within a master-set of observed events is provided. The system includes a k-dimension random variable generator for generating random variables for each event within the event set E for each j=1 . . . k dimensions, where k is predetermined. The system also includes an observed event segmenter for segmenting the master-set of observed events to produce a plurality of observed event segments, $(d_{11},s_{11} \ldots d_{1m}, s_{1m}) \ldots (d_{h1},s_{h1} \ldots d_{hm},s_{hm})$, where d=segmented observed event, and s=a parameter associated with the observed event and a weighting function generator. An observed event vectorizer for vectorizing each observed event segment $(d_{11},s_{11} \ldots d_{1m},s_{1m}) \ldots (d_{h1},s_{h1} \ldots d_{hm},s_{hm})$ according to the weighting function provided by the weighting function generator and the dimensional random variable corresponding to the segmented observed event d and dimension k is also provided. In addition, a query event vectorizer for vectorizing the query set of events $(Qe_1,Qs_1 \ldots Qe_w,Qs_w,)$ according to the weighting function, the dimensional random variable corresponding to the query event Qe, and dimension k, wherein Qe=a query event, Qs=a parameter associated with the query event Qe is also provided. In addition, the system includes a comparator for comparing the vectorized query-set of events with each vectorized observed event segment and generates the observed event segment in accordance with the comparison results and predetermined similarity factors.

In accordance with another embodiment of the invention a method is disclosed for finding similar situations in sequences of events in a data flow, the method including the steps of mapping, using a random projection, slices of a sequence of events to multidimensional (k) vectors and mapping a query sequence of events to a multidimensional (k) query vector. The next step searches among the event vectors for such multidimensional vectors for which the distance from the query vector is small or within a predetermined range or value. The last step verifies the event segment using event edit techniques.

The invention is also directed towards a program storage device readable by a machine, tangibly embodying a program of instructions executable by the machine to perform method steps determining similarity between a first event set, the first event set comprising a first plurality of event types, and a second event set, the second event set comprising a second plurality of event types. The method includes steps of mapping an observed event set to a multidimensional vector-Q and mapping a query event set to a multidimensional query vector-q. The next step is a comparison of the vectors for a predetermined similarity according to: $\|Q-q\| \leq SV$, where SV=a predetermined similarity value.

BRIEF DESCRIPTION OF THE DRAWINGS

The foregoing aspects and other features of the present invention are explained in the following description, taken in connection with the accompanying drawings, wherein:

FIGS. 4A–4D are graphs of an a priori event distribution, two independent streams of events following the same joint density, and their cross-correlation, respectively. The probability of observing 10 or more pairs in the analyzed lag intervals is 0.19% for a uniform model, but is 68% considering the a priori event density shown in FIG. 4A;

FIG. 5A shows the pairwise dependency with the use of burst information; FIG. 5B shows the pairwise dependency using only the yes/no burst information; dashed lines show weaker dependencies; and demanding greater confidence (smaller $\delta$) renders these events independent;

FIGS. 6A1–6A3 and 6B1–6B3 are graphic examples of synthetic data on a small interval; FIGS. 6A1–6A3 represent uniform a priori event density, observed events, and approximated density (averaging on 30 seconds interval), respectively; FIGS. 6B1–6B3 represent burst type a priori event density, observed events, and approximated density (averaging on 30 seconds interval), respectively; note that density scales differ; on graphs 6B1–6B3 the increase of activity of event #2 after event #3 (in about 100 seconds—four last events) and after event #4 (at 810,850 and 875, seconds) can be seen;

FIGS. 17, 17A and 17B is a table showing distances of fifty closest windows for k=15, alarm data.

DETAILED DESCRIPTION OF THE PREFERRED EMBODIMENT

The method and system described herein in the present invention decreases the amount of needed computations and thus computational time by projecting or mapping slices to diminish the dimensions of data. The projections being such that information of the slice structure is preserved, thus making similarity finding possible and effective.

Figures 8, 8A, 8B:
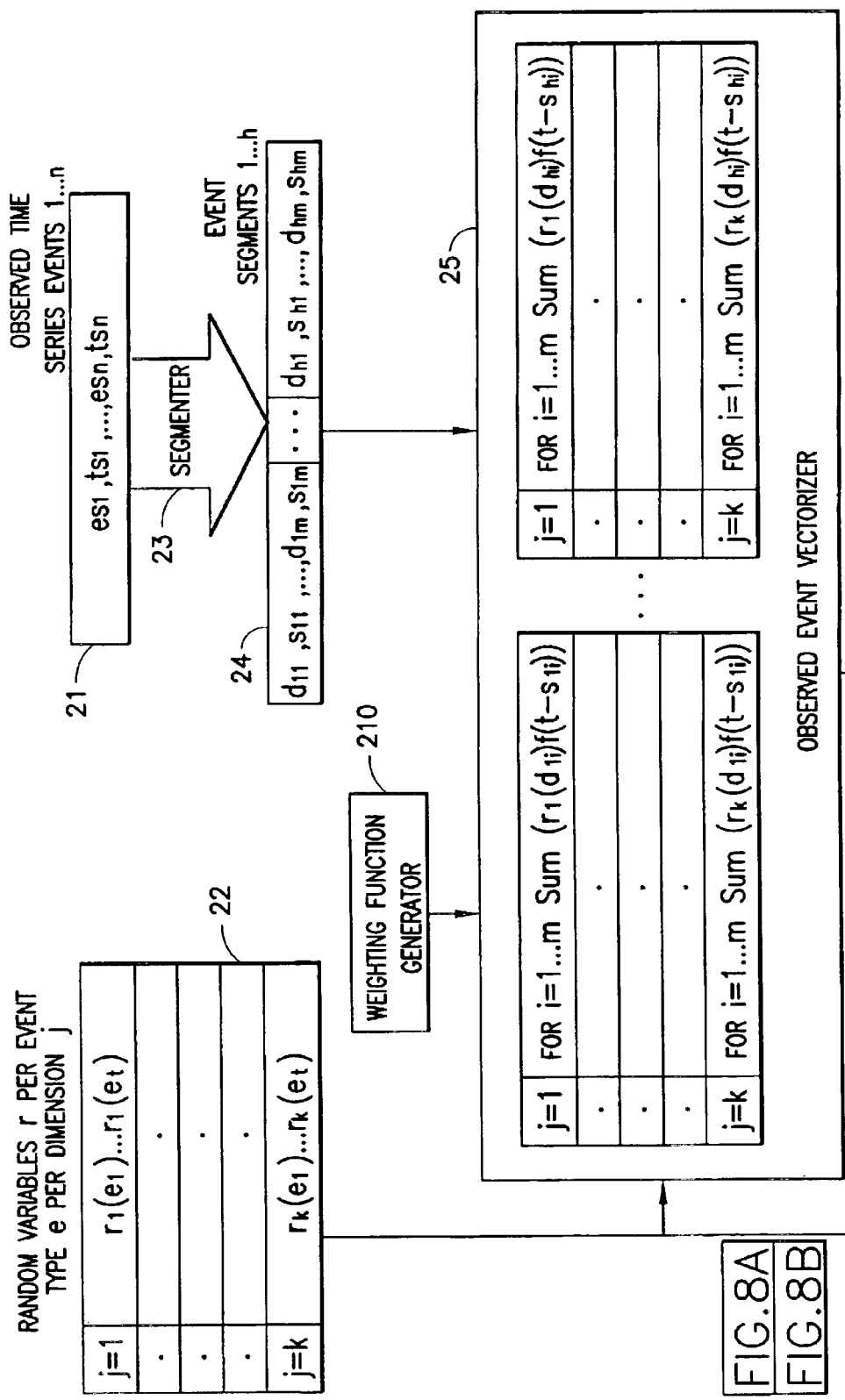
FIGS. 8, 8A and 8B is system diagram illustrating pattern matching features of the present invention.
Figure 8B:
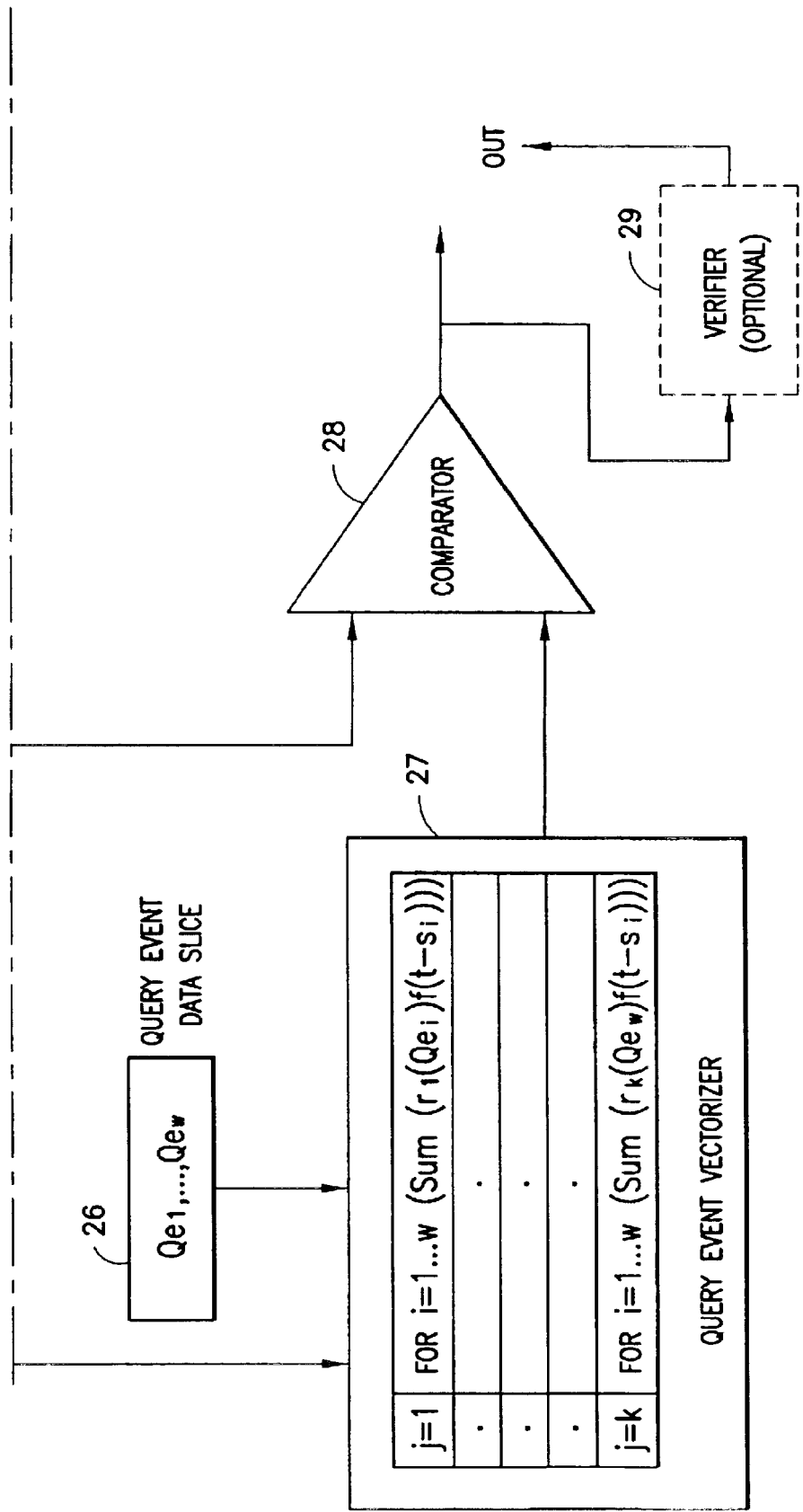

Referring to FIG. 8, there is shown a block diagram of a system having an observed event segementer 23 and an observed event vectorizer 25 for mapping event segments to j-dimensional Euclidean space. The observed event vectorizer 25 maps the observed event segment to a particular Euclidean dimension by selecting a random variable for the observed event in a particular dimension j from random variable generator 22. In alternate embodiments the random variable generator 22 may be any suitable generator, or it may be a predetermined look-up table. Continuing, the observed event vectorizer 25 weights the random variable for the particular dimension with a predetermined function. The predetermined weighting function may be any suitable linear or non-linear function generated by weighting function generator 210. The vectorizer 25 continues to weight each random variable for each observed event for the particular dimension, summing each weighted random variable with the previous weighted random variable. Similarly, a query event data slice 26 is vectorized by query event vectorizer 27. The vectorized query event is then compared with vectorized observed events by comparator 28. When comparator 28 detects a similarity within predefined limits, the pre-vectorized observed data segment is output. In alternate embodiments the pre-vectorized observed data segment may be further tested by standard event edit techniques by an optional verifier, 29. Although the present invention will be described with reference to the embodiments and examples shown in the drawings, it should be understood that the present invention could be embodied in many alternate forms of embodiments.

Figure 7:
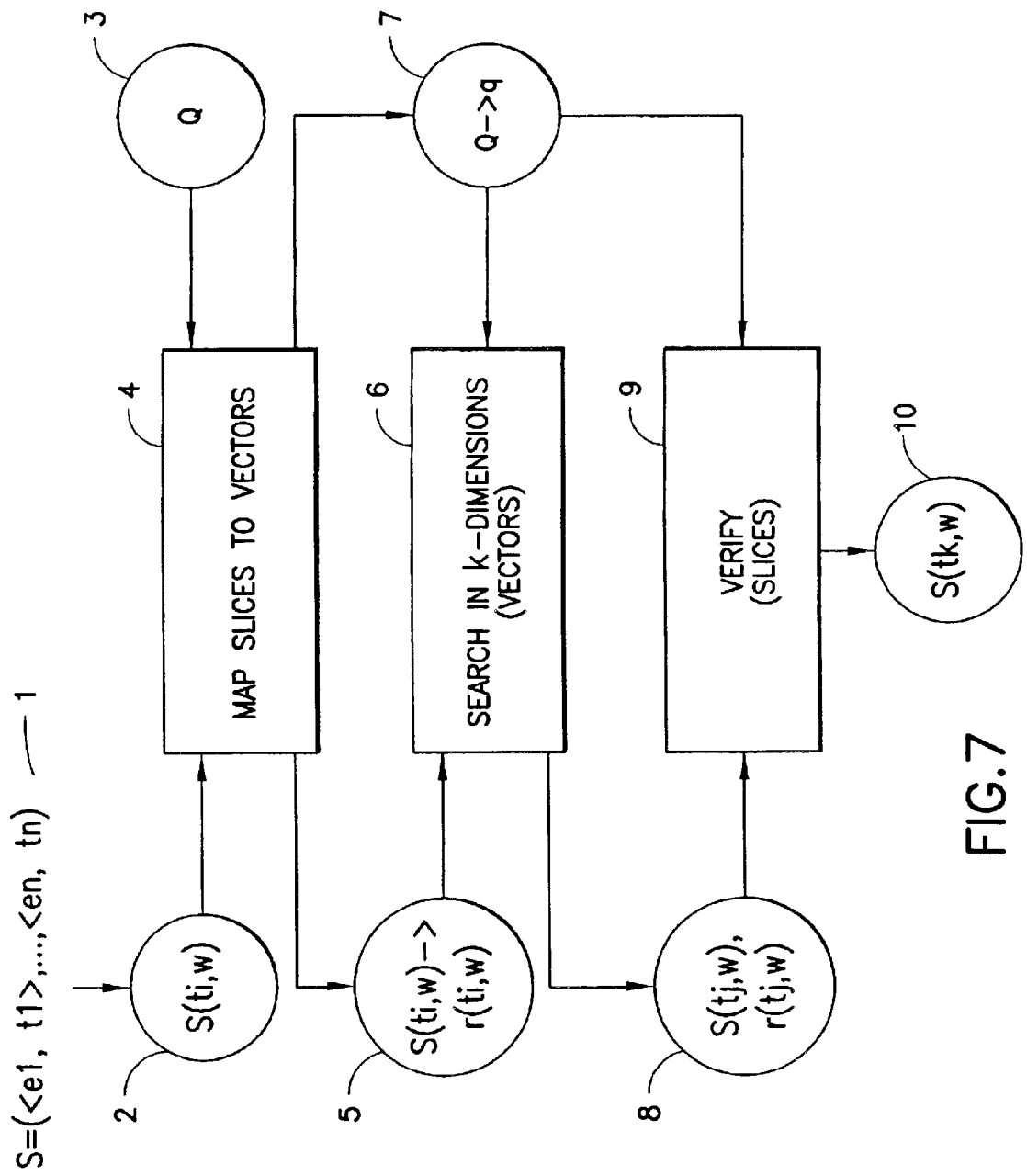
FIG. 7 is a flow chart showing method steps for incorporating event matching features of one embodiment of the present invention.

Referring now to FIG. 7, there is shown a method flow illustrating steps for performing the event searching features shown in FIG. 8. Using random projections, portions or slices, step 2, of events of S that have happened during the last w time units, or a slice of width w defined as an sequence of events e∈E of interest, step 1, are mapped to Euclidean k-dimensional space. Mapping, step 4, maps the event slices to k-dimensional vectors, step 5 and the query sequence of events, step 3, to a query vector, step 7. The method then searches, searching, step 6, using a normal linear search or more advanced data structures to be discussed later, for the vectors, step 8, that are closest to the query vector from step 7. The closeness, or similarity, meaning that the norm of the difference between found vectors, step 8, and the query vector, step 7 is small or within a predetermined range or metric. Then, by applying edit distance computation for each slice of events corresponding to a vector found in step 8, verifying, step 9, its similarity to the query sequence from step 3, Q, step 10.

The random projections are used to compute the k-dimensional vector representation $r(t_i,w)$ of each of the slices $S(t_i,w)$ and the query sequence Q. To perform the random projections, or mappings, step 4, for each event type e∈E and for each j=1, ..., k let $\rho(e,j)$ be a normally distributed random variable with mean 0 and variance 1. Let $f$ be a function from [0,w] to [0,1]. Given an event sequence 1, $S=(<e_1,t_1>, \ldots, <e_n,t_n>)$, and a time t, denote by $S(t,w)$ the slice of S defined as the subsequence of S consisting of those events that happen within the half-open interval (t−w, t]. Let this sequence consist of the events $<e_u,t_u>, \ldots, <e_v,t_v> \equiv <d_1,s_1>, \ldots, <d_m,s_m>$, where $1 \leq u \leq v \leq n$ and m=v−u+1. The random mapping, step 4, of S(t,w) to the k-dimensional vector $r(t,w)=(y_1(t), \ldots, y_k(t))$ can be for example defined as $$y_j(t) = \sum_{i=1}^{m} f(t-s_i)\rho(d_i, j).$$ EQ. A1

The function $f$ can be chosen to be linear, for example $f(x)=x/w$, in which case there exists an algorithm to compute the vectors $r(t_i,w)$ for all the slices $S(t_i,w)$ of S. In this embodiment we can write $$y_j(t) = w^{-1}\left(t\sum_{i=1}^{m}\rho(d_i, j) - \sum_{i=1}^{m} s_i\rho(d_i, j)\right)$$ EQ. A2

For all j=1, ..., k and all p=1, ..., n let $$A_j(p) = \sum_{i=1}^{p}\rho(d_i, j),$$ EQ. A3 and $$B_j(p) = \sum_{i=1}^{p} s_i\rho(d_i, j)$$ EQ. A4

Further, let $A_j(0)=0$ and $B_j(0)=0$ for all j. Then $A_j(p)$ and $B_j(p)$ can be computed in time linear in n, the total number of events in the original sequence. We have $$y_j(t)=w^{-1}(t(A_j(m)-A_j(h-1))-(B_j(m)-B_j(h-1))),$$ EQ. A5 showing that given $A_j$ and $B_j$ and the indices m and h corresponding to the interval (t−w,t], the value $y_j(t)$ can be computed in constant time.

Another, non-linear example of the function $f$ could be the exponential function $f(x)=e^{-x}$. The algorithm in this embodiment would be:

$$y_j(t) = \exp(-t)\left(\sum_{i=1}^{m} \exp(s_i)\rho(d_i, j)\right).$$ EQ. A6

Letting $$C_j(p) = \sum_{i=1}^{p} \exp(s_i)\rho(d_i, j)$$ EQ. A7 and $C_j(0)=0$, then $$y_j(t)=\exp(-t)(C_j(m)-A_j(h-1)),$$ EQ. A8 again showing that after a linear-time pre-processing for computing $C_j(0), \ldots, C_j(p)$, we can compute each $y_j(t)$ in linear time. It will be appreciated that in alternate embodiments any suitable weighting function may be used.

Thus, having accumulated, possibly a long sequence S, of events e∈E and defined a query sequence Q of events of a relative time interval of length w, the random projection can be used efficiently to find the slices, (FIG. 7, step 10) of S that are similar to sequence Q.

In the search phase, step 6, using normal linear search or more advanced data structures the vectors 8, $r(t_j,w) \subseteq r(t_i,w)$, which are close to the vector q, step 7, can be found; closeness meaning that the norm $\|r(t_j,w)-q\|$ is small or within a predetermined metric.

In the verifying phase, step 9, after finding the vectors from step 8, r(t_j,w), the closeness of the corresponding slices S(t_j,w) to the sequence Q can be verified and refined, using edit distance computations, yielding the final result, step 10.

Thus, the method presented in the present invention avoids the need to do computationally complex full edit distance computations in the space of all slices of S by doing first the computationally more efficient search in the k-dimensional Euclidian space.

As an example the method described is applied on telecommunications alarm data. In one example we consider a query slice that can be presented in the form of a table as:

TABLE 1

| Event number | Alarm type | Relative time |
|---|---|---|
| 1730 | 7260 | 0 |
| 1729 | 7277 | 29 |
| 1728 | 1585 | 224 |
| 1727 | 1940 | 821 |

Applying the method the present invention describes, the following slice is found to be similar with the query slice.

TABLE 2

| Event number | Alarm type | Relative time |
|---|---|---|
| 29212 | 7277 | 0 |
| 29211 | 7260 | 1 |
| 29210 | 1585 | 205 |
| 29209 | 1940 | 536 |
| 29208 | 7403 | 646 |
| 29207 | 1903 | 825 |
| 29206 | 7711 | 915 |
| 29205 | 7705 | 982 |

In another example the following query slice shown in Table 3 is used to test the method described in the present invention:

TABLE 3

| Event number | Alarm type | Relative time |
|---|---|---|
| 38000 | 1553 | 0 |
| 37999 | 1553 | 0 |
| 37998 | 1553 | 300 |
| 37997 | 1553 | 300 |
| 37996 | 7002 | 313 |
| 37995 | 7701 | 489 |
| 37994 | 7002 | 553 |
| 37993 | 1553 | 600 |
| 37992 | 1553 | 600 |
| 37991 | 1553 | 900 |
| 37990 | 1553 | 900 |

Using the method described in the present invention, the following slice shown in table 4 is from the sequence of events is found to be similar to the above query slice.

TABLE 4

| Event number | Alarm type | Relative time |
|---|---|---|
| 37988 | 1553 | 0 |
| 37987 | 1553 | 0 |
| 37986 | 7002 | 72 |

TABLE 4-continued

| Event number | Alarm type | Relative time |
|---|---|---|
| 37985 | 1553 | 300 |
| 37984 | 1553 | 300 |
| 37983 | 1553 | 600 |
| 37982 | 1553 | 600 |
| 37981 | 7701 | 621 |
| 37980 | 7002 | 692 |
| 37979 | 1553 | 900 |
| 37978 | 1553 | 900 |

This slice gives the minimum distance at the position 37988 of the telecommunications alarm data. The distance between the slice and the query slice, with k=9, is 0.107156, computed as the distance between the vector representations of the query slice and the found similar slice, calculated according to the description of the present invention.

Known edit distance computations take time O(nm) for slices of lengths n and m, with fairly large constant factors. The time and space complexity of the method described in the present invention is O(kn), n being the length of the query slice and k being the dimension of the used Euclidian space. The larger the length of slices is the more is gained in terms of decreasing computational complexity when using the method described in the present invention. In practical embodiments k can be chosen to be noticeably smaller than the length of the slices without loosing the perseverance requirement of the random projections and the method of the present invention.

For the perseverance feature of the method described in the present invention, consider the following cases:

Given two identical slices S(t,w) and S(t',w), the random vectors r(t,w) and r(t',w) are obviously identical and thus the distance between the two vectors is zero.

For two slices that are quite close to each other, consider the slices S(t,w)=(<$d_1,t_1$>, <$d_2,t_2$>, ..., <$d_m,t_m$>) and S(t',w)=(<$d_2,t_2$>, ..., <$d_m,t_m$>), i.e. the slices are identical except that the latter does not have the element <$d_1,t_1$>. For simplicity, assume that $f(t-t_i)=1$ for all $t_i$. Then the squared distance between vectors r(t,w) and $$r(t', w) \text{ is } d^2 = \sum_{i=1}^{k} r(d_1, i)^2.$$

Since the variables $p(d_1,i)$ are independent identically distributed, the expected value of the squared distance is $E(d^2)=kE(\rho(d_1,1)^2)=k$. The variance is $E(d^4)-E(d^2)^2=k(3-1^2)=2k$.

In contrast, consider the squared distance from the origin to a vector obtained by mapping a random m-event slice S(t,w)=(<$d_1,t_1$>, ..., <$d_m,t_m$>). Every element of the vector r(t,w) is a sum of random variables, $$r_i(t, w) = \sum_{j=1}^{m} f(t - t_j)\rho(d_j, i).$$

Assuming they are independent, i.e., that no event is repeated in the slice, the expected value of $r_i(t,w)^2$ is $$E(r_i(t, w)^2) = \sum_{i=1}^{m} E(\rho(d_j, i)^2) = mE(\rho(d_1, i)^2) = m,$$

so the expected squared distance from the origin to the vector is km. For the variance, we get $$E(r_i(t, w)^4) - E(r_i(t, w)^2)^2 =$$

$$\sum_{j=1}^{m} \left[ (E(\rho(d_j, i))^4 - (E(\rho(d_j, i)^2)^2 \right] = m[3 - 1^2] = 2m,$$

so the variance of the squared distance is 2 km. Thus the expected difference between the two similar slice vector representations relative to the expected length of the vectors is of order $$(m)^{\frac{1}{2}},$$

i.e. for practical values of m the expected distance between vector representations of the similar slices is small.

Thus the editing operations of inserting and deleting one event have small expected effect on the distance, compared to arbitrary vectors in the k-dimensional space. In the previous analysis, we assumed that all the events have equal weight. In practice, the effects of these editing operations will be even smaller for events towards the low-weight end of the slice. Also, assuming a continuous function ƒ, the editing operation of moving an element in time has an effect proportional to the length of the time change, just as in the notion of editing distance. Therefore, the approximated distance is small when a slice is subjected to a small number of editing operations.

The inverse relationship can also be shown. That is, if two slices (i.e., segments) are far from each other, then the corresponding random vectors are far from each other with high probability.

Examples of the present invention follow. First, recall that the goal is to locate previously occurring situations that resemble the current one. To test how well this goal is met, the following experiments for alarm data are shown. The alarm data consists of 46662 alarms over a period of a month. The time values seen on the x-axis of several figures are in seconds, and they range from about half a million to three million. The figures show only a subset of the full range for reasons of legibility. There are 180 types of alarms occurring in the data. The Entree Chicago data comes from the log of an application which provides restaurant recommendations on the Web. Here, we consider only the final recommendation made by the system for a single user. The data is converted from the date/time information to seconds since the beginning of 1970 (a popular way of expressing time in some operating systems, so the time values vary from about 842 million to 924 million, and again, the figures show a smaller range. The sequence contains 50672 events of 619 types.

Figure 10:
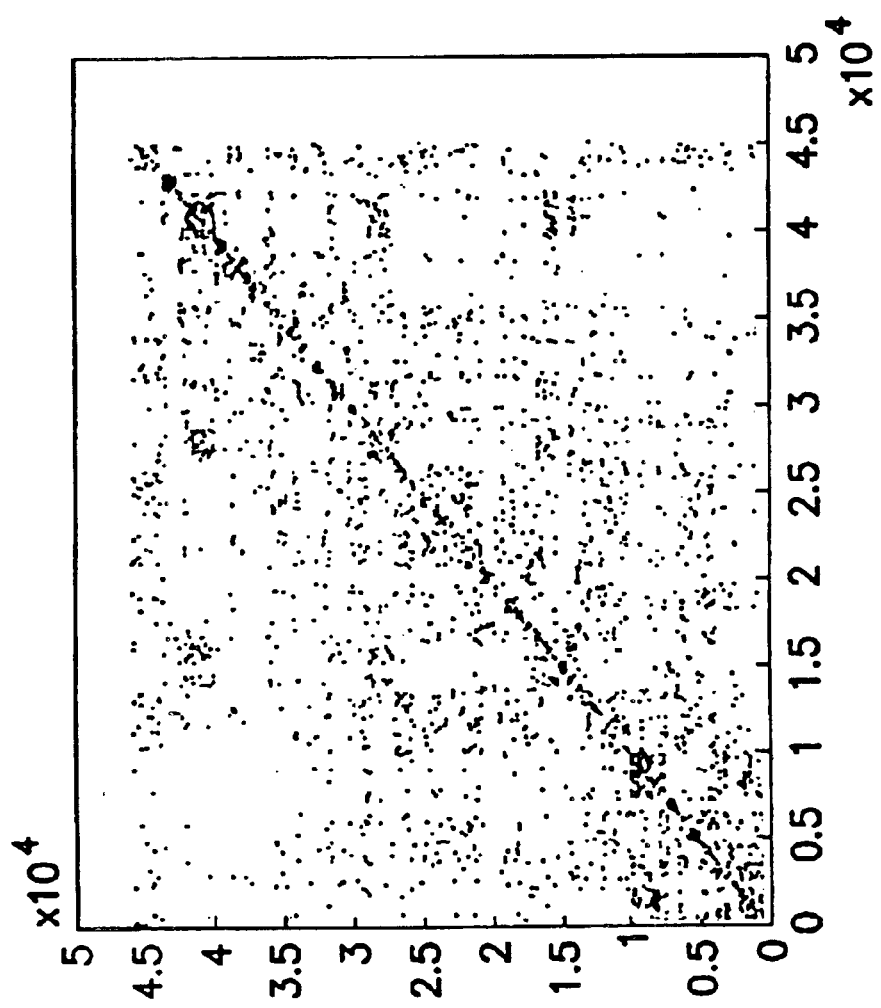
FIG. 10 is a scatter diagram of test data showing the location of the closest slice to the query slice for every $10^{th}$ event in the test sequence and for W=1000 sec.

First, to get a qualitative sense for the alarm test data, all closest slices for every $10^{th}$ window with w=1000 using the random mapping approximation was calculated. FIG. 10 shows the location for the closest match for each slice. Some temporal locality can be observed. Next, an artificial query window of width 1000 consisting of 37 events of 20 types was created. None of the event types occurred in the original sequence and 50 copies of this query window were pasted onto the alarm data. The pasting was made transparently, i.e., the original events were left into the sequence. Thus the modified sequence contains some clear copies of the query window, but most of the copies contain also other events. The query window was constructed by copying a part of the sequence and renaming the events. Next, exercising the mapping features of the present invention, with several values of the parameter k, and performing queries with the following rule: list all windows in the order of approximate distance to the query window, except when a window S is listed, disregard all subsequent windows that overlap S. For example, if (9000, 10000] is listed as one of the resulting windows, none of the windows (9000+i, 10000+i] for i=_999, . . . , 999 are listed.

Figure 11:
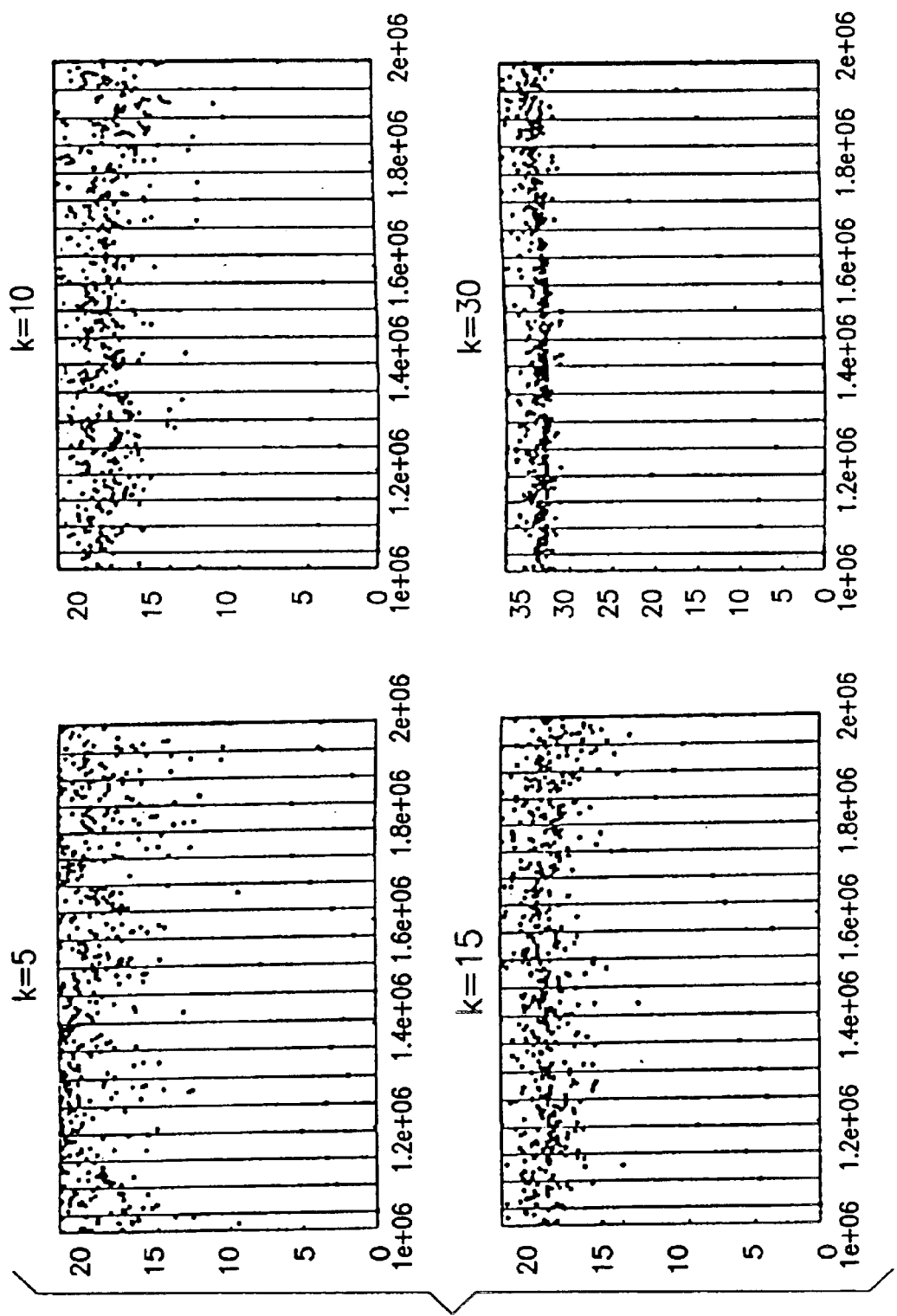
FIG. 11 is a collection of 4 scatter diagrams for various values of k, showing distances to selected windows of example alarm data.
Figure 12:
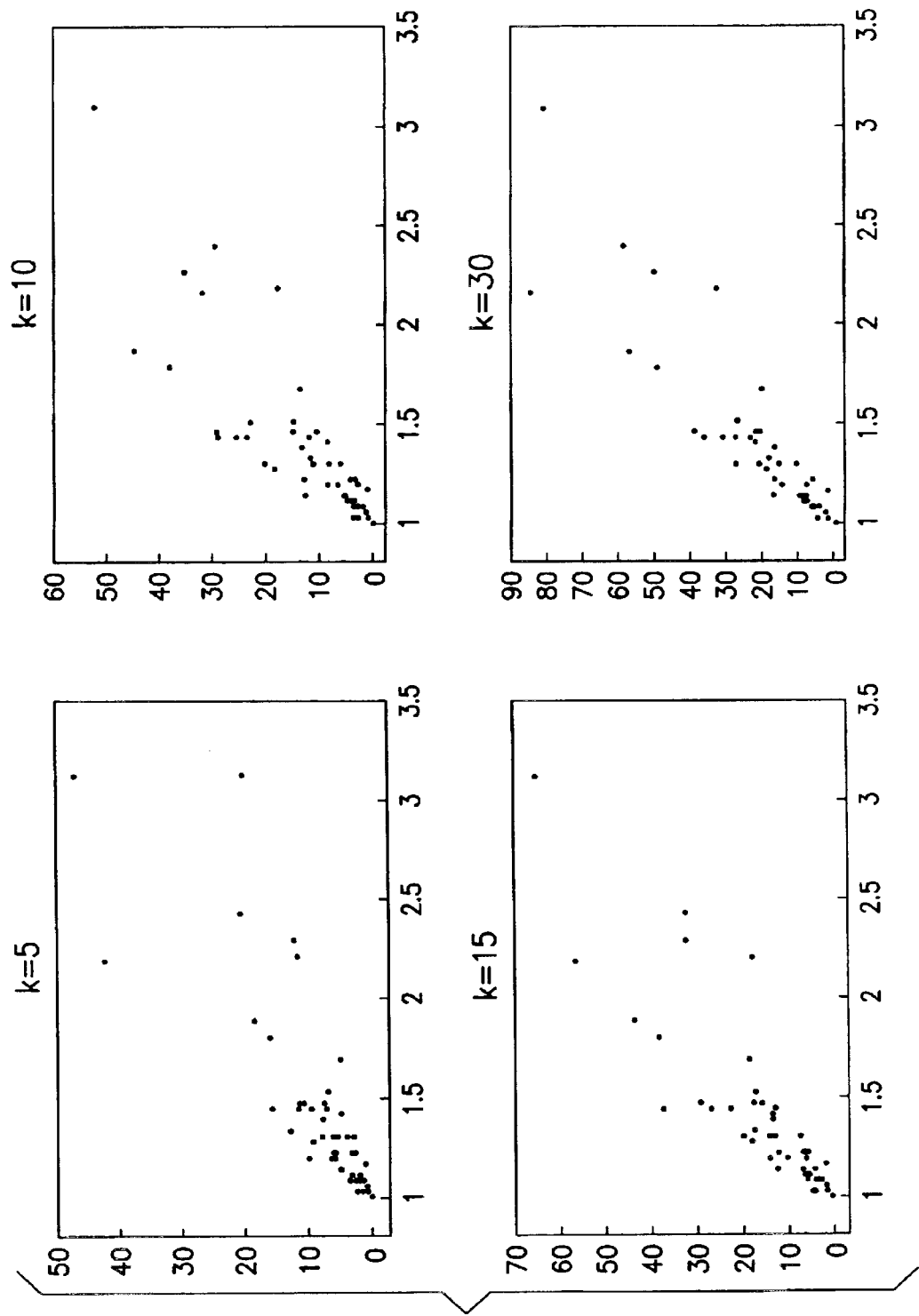
FIG. 12 is a collection of 4 scatter diagrams showing distances of target windows against the density ratio for various values of k for example alarm data.

FIG. 11 shows the distances of some of the resulting windows for k=5, 10, 15, 30. The x-axis gives the location in the sequence, and the y-axis gives the approximated distance, i.e., the Euclidean distance in k-space. The plots have been truncated at a point slightly above the median distance for scaling purposes, since some windows have extremely high distances. For legibility, the horizontal axis shows only a art of the full time scale. The vertical lines indicate the positions of the inserted windows. The best 50 non-overlapping windows in the case k=15 are listed in the table shown in FIG. 17. The first column gives the computed distance to the query window; in the first three cases, there were no extra events intermingled with the target, so the distance was zero. The second column indicates the position (i.e., time in seconds of the window, and the third one gives the position of the closest target window, if there is one within the window width 1000. The fourth column is simply the difference of the second and third ones. Of the 50 target windows, 22 are found exactly, and 20 more overlap one of the best 50 windows. Note how all the distances below 13 correspond to windows close to the targets, and distances up to about 5 are all exact hits. This is illustrated in FIG. 12, where the approximated distances of the inserted target windows are plotted against the "density ratio" |I'|/|I|,where |I| is the number of inserted events and |I'| is the actual number of events within the 1000-width target window, counting both inserted events and those that were art of the original sequence.

Figure 13:
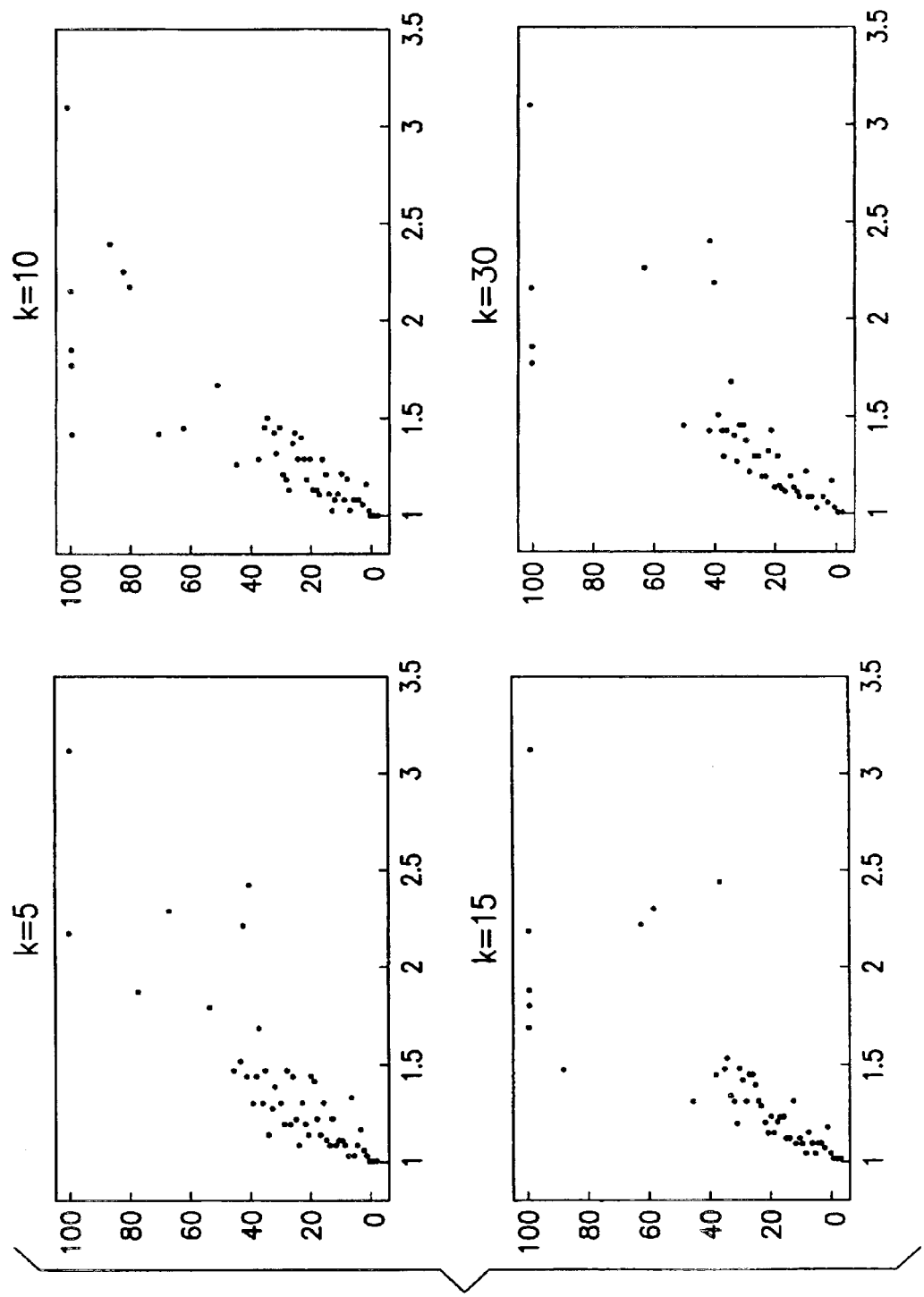
FIG. 13 is a collection of 4 scatter diagrams showing ranks of target windows against the density ratio for various values of k for example alarm data.

For each target window W, either W appears or one or two windows overlapping W appear in the sorted list where overlaps have been omitted. We call the "rank" of W in this listing the rank of the first listed window W∩W'+φ. Ties are resolved arbitrarily to give each window a unique rank. FIG. 13 shows the ranks of target windows against the density ratio defined earlier. Ranks greater than 100 are shown as 100. Note the effect of k: with a larger number of dimensions, the targets stand out better in FIG. 11, but the number of targets within the best windows doesn't increase very much. With this data, it seems that values of k around 5 or 10 are sufficient.

Figure 14:
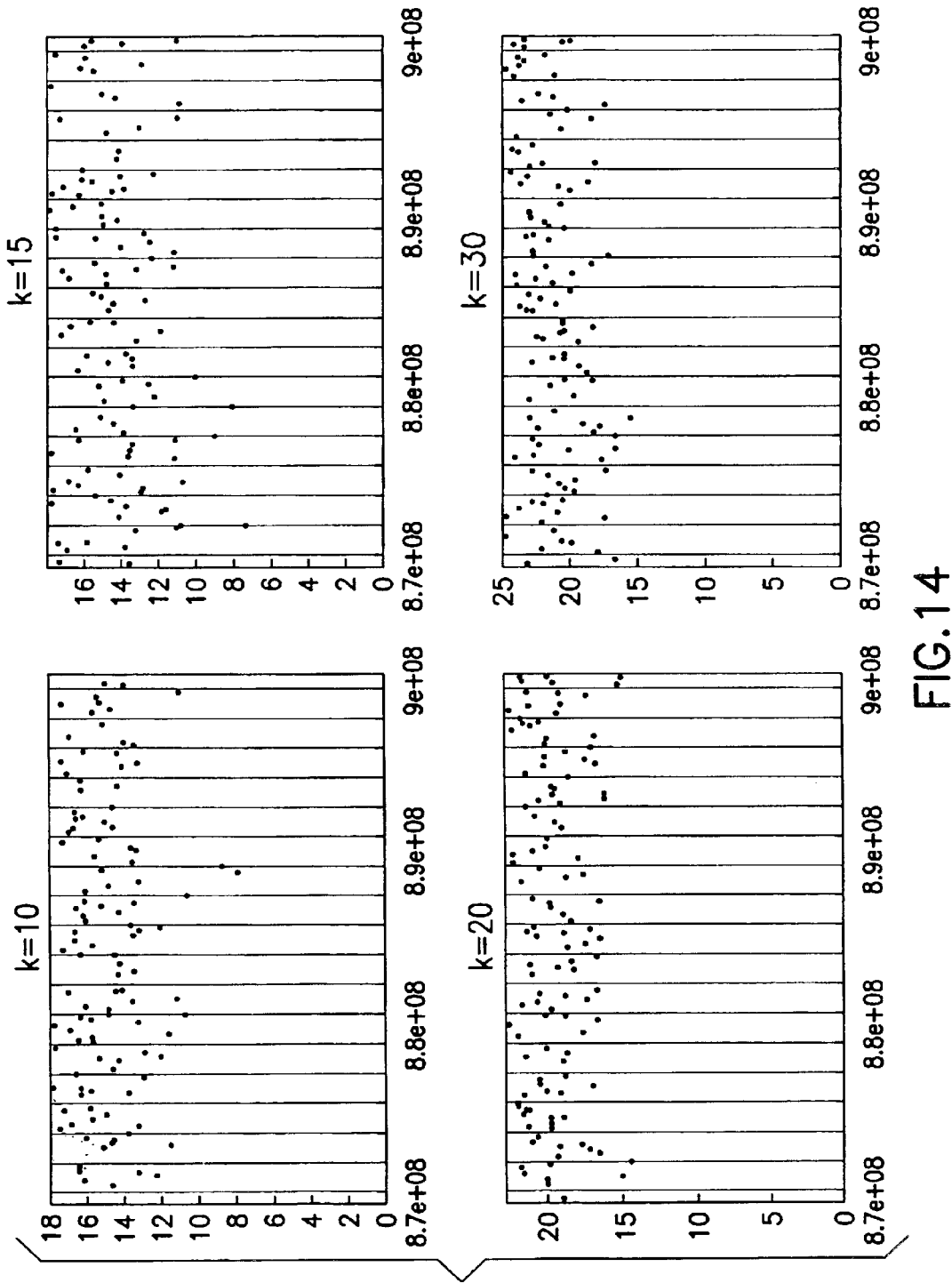
FIG. 14 is a collection of 4 scatter diagrams for various values of k, showing distances to selected windows of example Entrée Chicago data.
Figure 15:
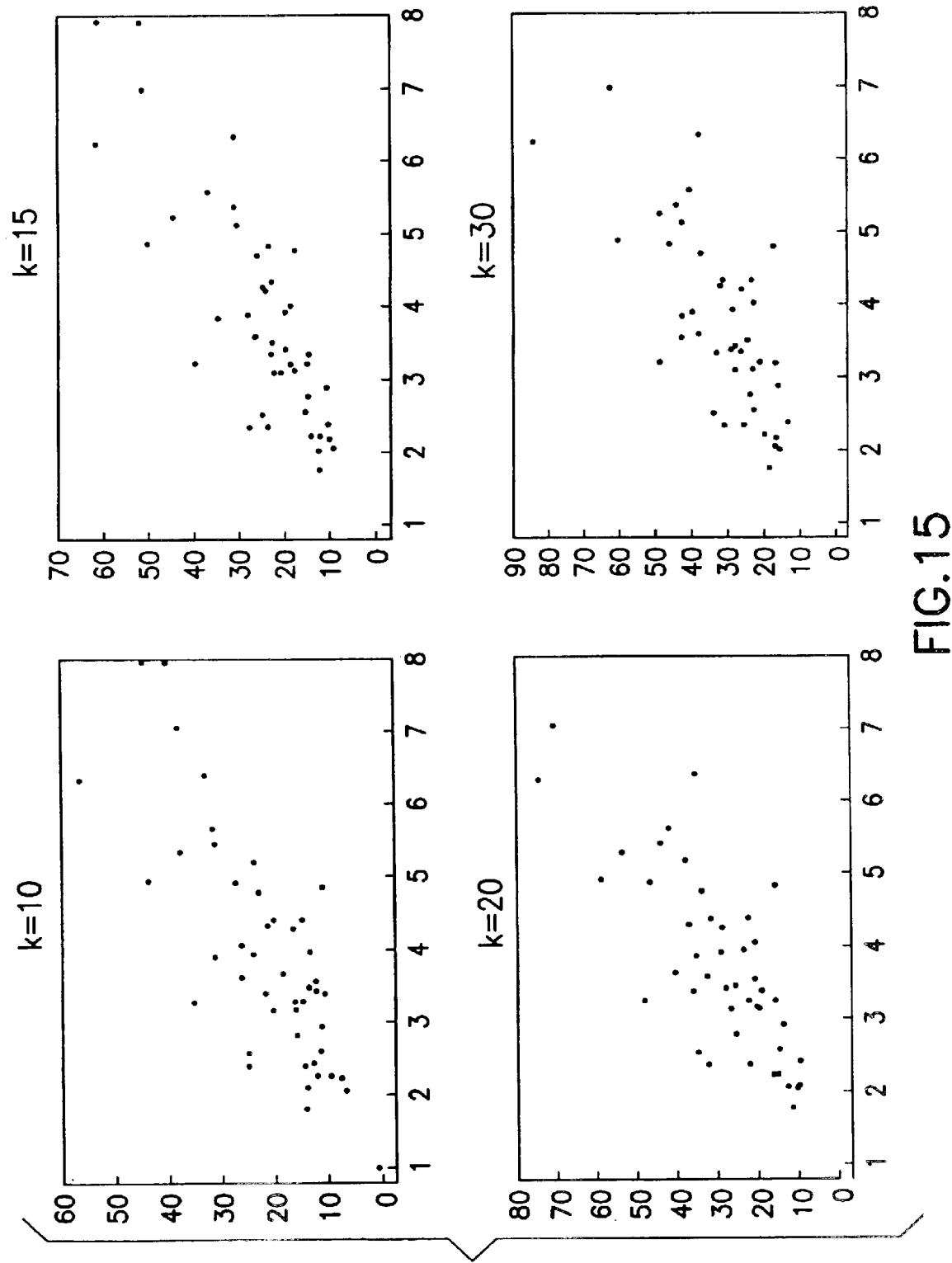
FIG. 15 is a collection of 4 scatter diagrams showing distances of target windows against the density ratio for various values of k for example Entrée Chicago data.
Figure 16:
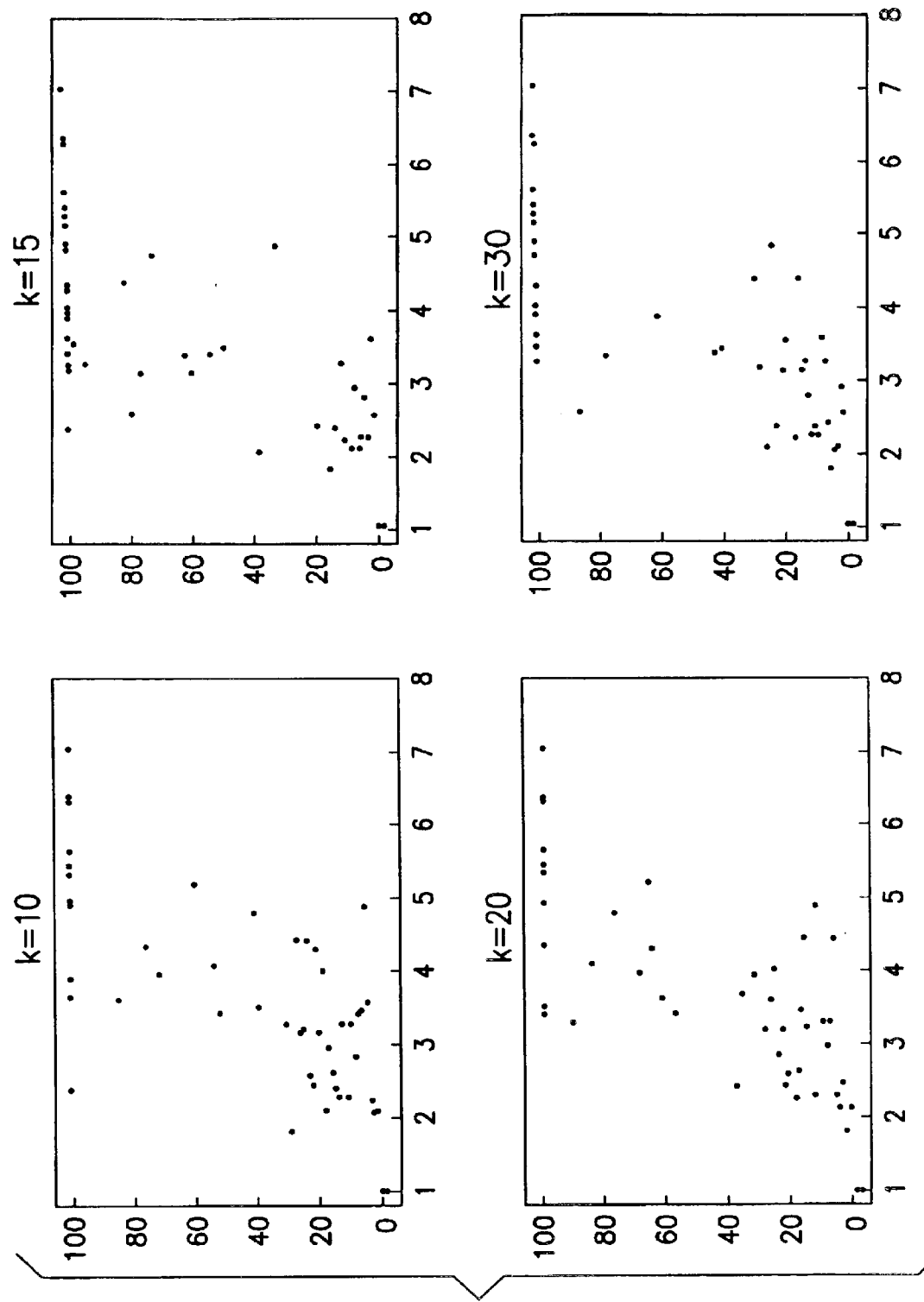
FIG. 16 is a collection of 4 scatter diagrams showing ranks of target windows against the density ratio for various values of k for Entrée Chicago data.

In the case of the Entree Chicago data, we again inserted 50 windows in the sequence. Since the time scale is different, we used 10000 seconds as the window width. In contrast to the previous experiments, the inserts contain mostly event types that also appear in the original sequence: of the 24 events in the insert, 10 are artificial (ones that don't appear in the unmodified sequence. This makes the targets a bit harder to recognize, but they should still be quite far away from other windows. As in the previous case, the insert was obtained by taking a art of the sequence and renaming some events. FIG. 14 shows the distances of windows selected as in the case of alarm data. The values of k shown are 10, 15, 20 and 30. The lots indicate that several of the targets can be found in this case as well. With this data and this insert, the density ratio of the targets was higher than in the previous case. This is nicely shown in FIGS. 15 and 16, plotted for the cases k=10 and k=30.

Figure 9:
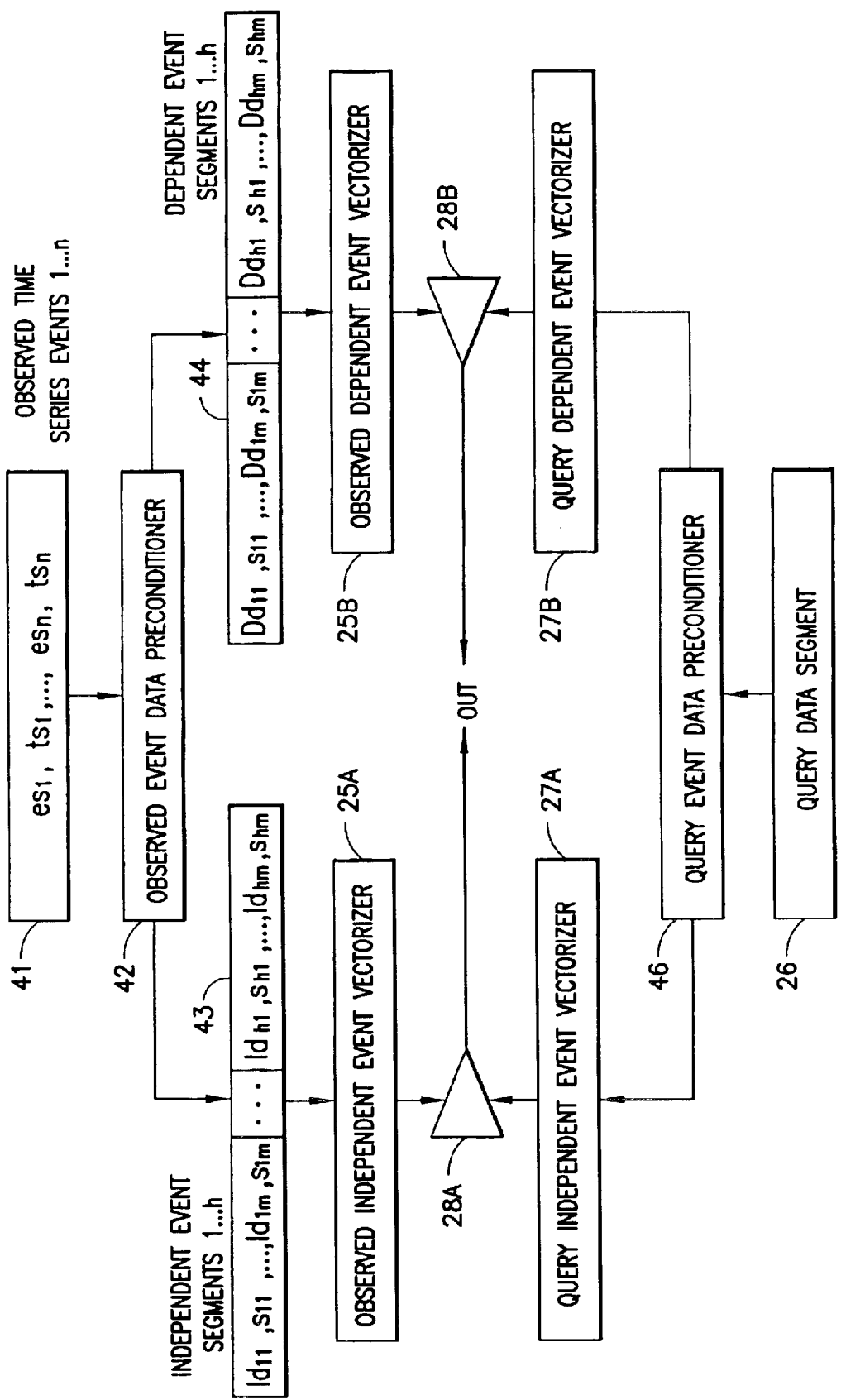
FIGS. 9 and 9A are system diagrams illustrating pattern preconditioning features of the present invention.

Referring to FIG. 9, an alternate embodiment may decompose the observed and query events into independent and dependent events before vectorizing the event segments. The decomposability of an event sequence may be stated as whether there are two (or more) unrelated sets of event types such that the corresponding event subsequences are independent. In this embodiment, an observed event data preconditioner, 42, preconditions the data into independent event segments 43 and dependent event segments 44. Similarly, the query event segment is separated by query event data pre-conditioner to segment the query event slice into independent query events and dependent query events. Vectorizers, 25A, 25B and 27A, 27B, operate as described above, as do comparators 28A and 28B.

Figure 9A:
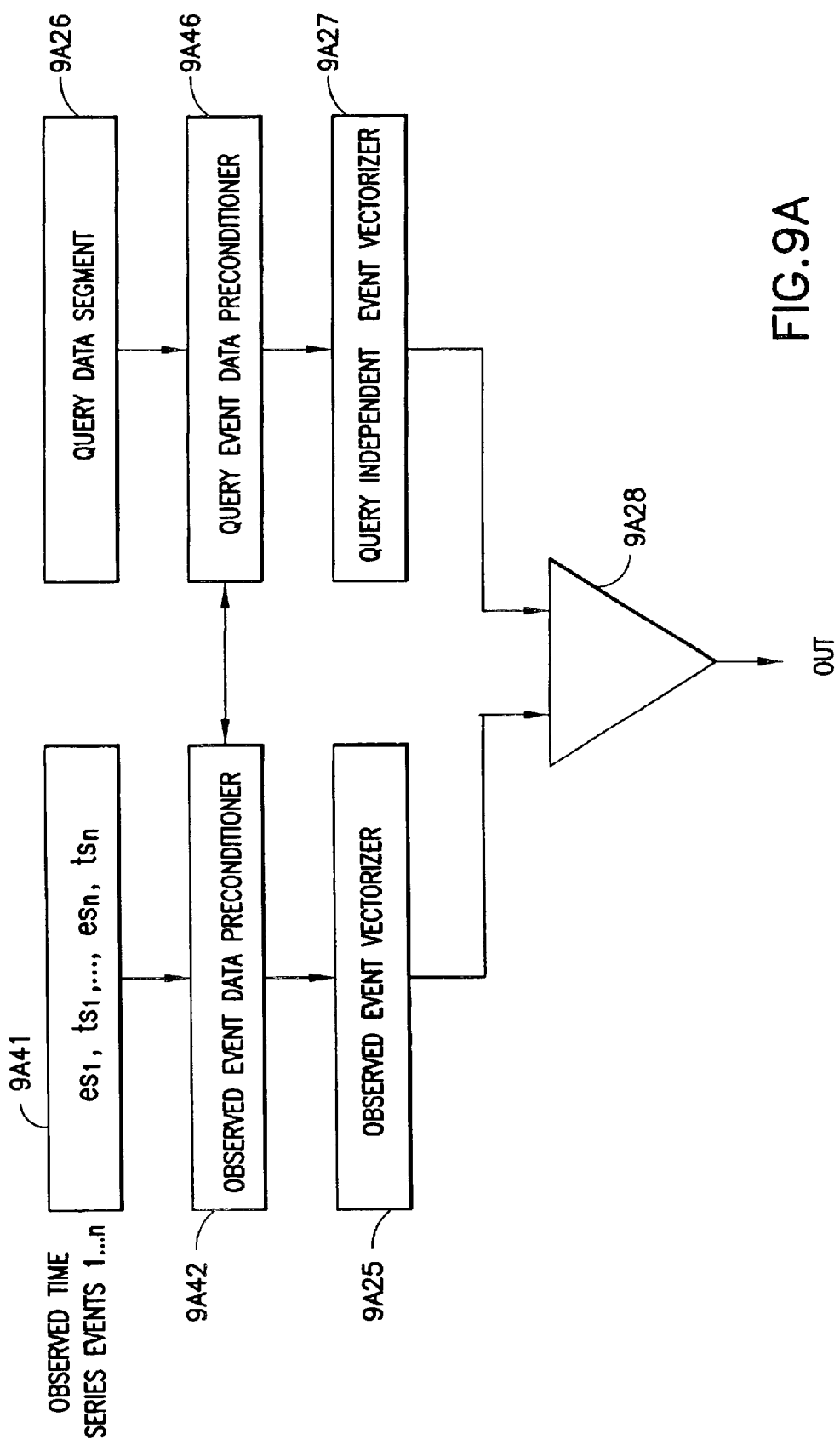

Referring to FIG. 9A, an alternate embodiment may precondition the observed and query event sets 9A41 and 9A26 according to a statistical analysis of the query event set 9A26 by query event data pre-conditioner 9A46. The output of query event data pre-conditioner 9A46 is then used as an input to observed event data pre-conditioner 9A42. It will be appreciated that in alternate embodiments, observed event data pre-conditioner 9A46 may statistically analyze the observed data set 9A41 and use the results in conjunction with, or independent of, the statistical analysis results provided by query event data pre-conditioner 9A46. Vectorizers, 9A25 and 9A27 operate as described above, as does comparators 9A28.

Referring again to FIG. 9, the event data pre-conditioners for separating events into independent and dependent sets are described as follows.

We consider the input as a sequence of events, where each event has an associated time of occurrence. Given a set $E=\{e_K\}$ of event types, an event is a pair (A,t), where $A \in E$ is an event type and $t \in N$ is the occurrence time of the event. Note, that we often use the term event referring to the event type; the exact meaning should be clear from the context.

An event sequence s on E is an ordered sequence of events, $$s=<(A_1,t_1),(A_2,t_2),\ldots,(A_n,t_n)> \quad (1)$$

such that $A_i \in E$ for all $i=1,\ldots,n$, and $t_i \in [T_s,T_e], t_i \leq t_{i+1}$ for all $i=1,\ldots,n-1$, where $T_s$, $T_e$ are integers denoting the starting and ending time of the observation. Note that we can have $t_i = t_{i+1}$, i.e., several events can occur at the same time. However, we assume that for any $A \in E$ at most one event of type A occurs at any given time.

Given an event sequence s over a set of event types E, and a subset $E_1 \subseteq E$, the projection s[$E_1$] of s to $E_1$ is the event sequence consisting of those events (e,t) from s such that $e \in E_1$. A sub-sequence of event $e_i$, denoted by $s_{ei}$, is a subsequence of s consisting only of the events of type $e_i$ from s, i.e., $s_{ei}$ is a projection of s onto $E_1=\{e_i\}$.

Alternatively, we can view s as a function from the observed period $[T_s,T_e]$, into $\{0,1\}^{|E|}$, and $\{s_{ei}\}_{ei \in E}$ as functions from $[T_s,T_e$ into $\{0,1\}$, such that $s=s_{ei}x \ldots xs_{eK}$. In such formulation, s(t) denotes the events that happened in the time unit t.

EXAMPLE

Figure 1:
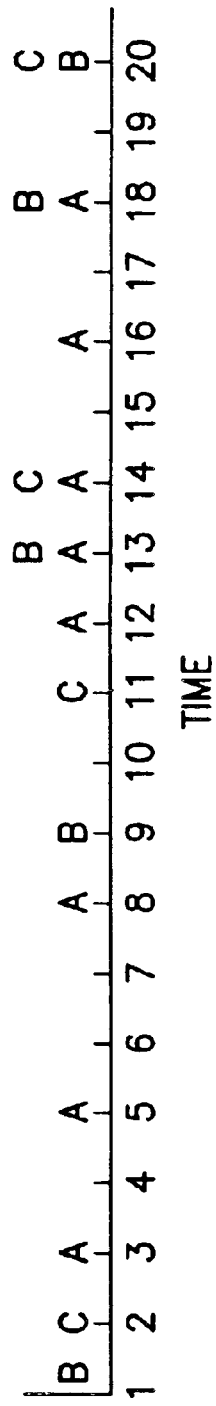
FIG. 1 is a timeline sequence of events A,B, and C observed during a twenty second window.

FIG. 1 presents the event sequence of three events types E={A,B,C} observed for 20 seconds, that is $T_s=1$, $T_e=20$ and $$s=((B,1),(C,2),(A,3),(A,5),(A,8),\ldots,(B,20),(C,20)).$$

Figure 2:
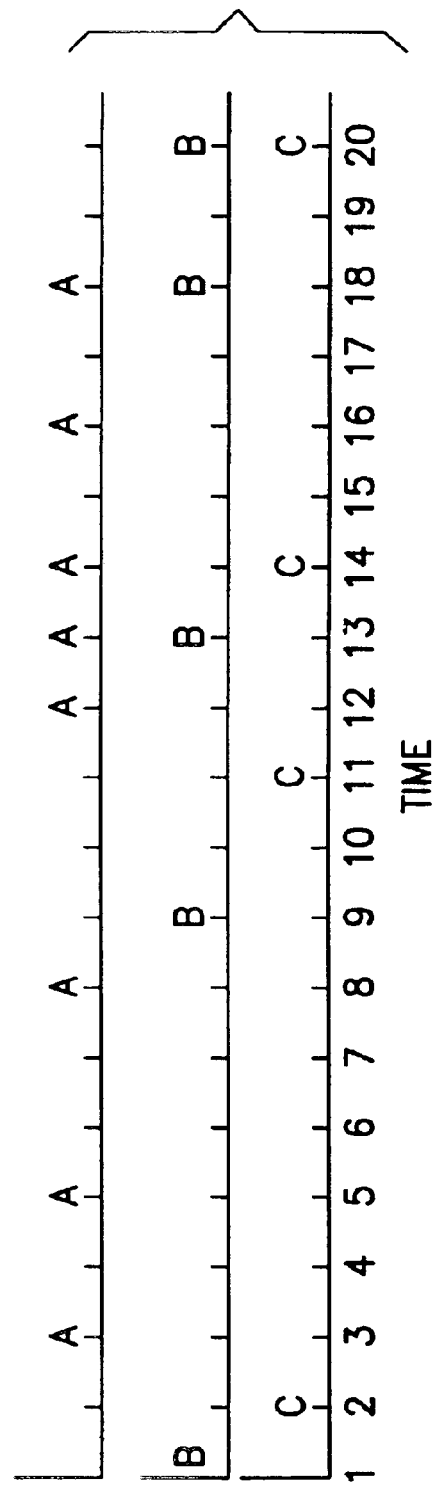
FIG. 2 is multiple timeline sequence of events for subsequences, $s_A, s_B, s_C$ of sequence s of events shown in FIG. 1.

Note that a number of events of different types can occur in the same second. The subsequences of sequence s are shown on FIG. 2 and they are $$s_A=((A,3),(A,5),(A,8),\ldots,(A,18))$$

$$s_B=<(B,1),(B,9),(B,13),(B,18),B,20)>$$

$$s_C=<(C,2),(C,11),(C,14),(C,20)>$$

It can be seen that event C always follows event B with one or two seconds lag. The C event that follows (B,20) was not observed due to finite observation time.

Treating s as a function from [1,20] into $\{0,1\}^3$ we have $$s=<010,001,100,000,100,\ldots,000,011>$$

and $s_A$, $s_B$ and $s_C$ are just a binary vectors of length 20:

$$s_A=00101001000111010100$$

$$s_B=10000000100010000101$$

$$s_C=01000000001001000001. \quad \square$$

Decomposition of Event Sequences

In order to discuss the independence properties we are intesrested in, we have to provide a way of probabilistic modeling of event sequences.

Given a set E of event types, the set of all event sequences over E can be viewed as the set $F_E$ of all the functions Z: $[T_s,T_e] \to \{0,1\}^{|E|}$. That is, given a time t, the value Z(t) indicates which events occur at that time.

A probabilistic model for event sequences is, in utmost generality, just a probability distribution $\mu_E$ on $F_E$. For example, $\mu_E$ may depend only on the total number of the observed events and give a higher probability to the sequences that contain N events $a \cdot e^{-(N-N_Z)^{2/b}_2}$ i.e., $\mu_E(Z)=$ where $N_Z$ denotes the total number of $$\sum_{t=T_s}^{T_e} \|Z(t)\|_1,$$

events in Z, $N_Z$=and a, b are some appropriate constants. Note that in this example all event sequences are dependent.

Next we define what it means that a distribution of event sequences is an independent composition of two distributions. We use the analogous concept from the distribution of discrete random variables: Let $\{X_1,\ldots,X_p\}$ be a discrete variables and denote by $P(X_1=x_1,\ldots,X_p=x_p)$ the probability of observing the value combinations $(x_1,\ldots,x_p)$. Now P is an independent composition of distributions over variables $\{X_1,\ldots,X_j\}$ and $\{X_{j+1},\ldots,X_p\}$ if for all combinations $(x_1,\ldots,x_P)$ we have $$P(X_1=x_1,\ldots,X_p=x_p)=P_1(X_1=x_1,\ldots,X_j=x_j) \cdot P_2(X_{j+1}=x_j+1,\ldots,X_p=x_p) \quad (2)$$

where $P_1$ and $P_2$ are the marginal distributions defined by $$P_1(X_1=x_1,\ldots,X_j=x_j)=\Sigma_{(xj+1,\ldots,xp)}P(X_1=x_1,\ldots,X_j=x_j,X_{j+1},X_{j+1}\ldots,X_p=x_p)$$

$$P_1(X_{j+1}=x_j\ldots,X_p=x_p)=\Sigma_{(x1,\ldots,xj)}P(X_1=x_1,\ldots,X_j=x_j,X_{j+1}=x_{j+1},\ldots,X_p=x_p). \quad (3)$$

The above definition is, of course, easily extended for the decomposition of $\{X_1,\ldots,X_p\}$ into more than two subsets.

Now, let $E_1$ be a subset of E. The distribution $\mu_E$ defines naturally the marginal distribution $\mu_{E1}$ on $F_{E1}$.

$$\mu_{E_1}(s_1) = \sum_{s \in F_E, [E_1] = s_1} \mu_E(s) \quad (4)$$

We can now provide a decomposition definition:
Definition [Event set decomposition]: The set of event types E decomposes into pairwise disjoint sets $E_1, \ldots, E_m$ with $$\bigcup_{i=1}^{m} E_i$$

E= and $\forall i \neq j, E_i \cap E_j = \emptyset$ if for all $s \in F_E$:

$$\mu_E(s) = \prod_{i=1}^{m} \mu_{E_i}(s[E_i]). \quad (5)$$

That is, the probability of observing a sequence s is the product of the marginal probabilities of observing the projected sequences $s[E_i]$.

If E decomposes into $E_1, \ldots, E_m$, we also say that $\mu_E$ decomposes into $\mu_{E1}, \ldots, \mu_{Em}$ and that E consists of independent components $E_1, \ldots, E_m$. As a special case, if E consists of two event types A and B, it decomposes into A and B provided $$\mu_{(A,B)}(s) = \mu_A(s_A) \cdot \mu_B(s_B), \forall s \in F_{(A,B)}. \quad (6)$$

I.e., the occurrence probability of a sequence of A's and B's is the product of the probability of seeing the A's and probability of seeing the B's.

Finding Independent Components from Observed Sequences

Our goal is to start from observed sequence s over a set of event types E and to find sets $E_1, \ldots, E_m$ such that the probability of distribution $\mu_E$ on $F_E$ is decomposed into the marginal distributions $\mu_{E1}, \ldots, \mu_{Em}$. There are two obstacles to this approach: First, we only observe a sequence, not $\mu_E$. Second, the set of alternatives for $E_1, \ldots, E_m$ is exponential in size.

The first obstacle is considered in Section 3.1 where we show that certain quite natural conditions can be used to obtain information about $\mu_E$ from a single (long) sequence over E.

We next describe how to cope with the second obstacle. We overcome this problem by restricting our attention to pairwise interaction between event types. That is, given $\mu_E$, two event types A and B are independent, if for all $s \in F_E$ we have $$\mu_{\{A,b\}}(s[\{A,B\}]) = \mu_A(s_A) \cdot \mu_B(s_B) \quad (7)$$

We show in the next section how we can effectively test this condition.

Given information about the pairwise dependencies between event types, we search for independent sets of event types. Let G=(E,H) be a graph of E such that there is an edge between event types A and B if and only if A and B are dependent. Then our task is simply to find the connected components of G, which can be done in $O(|E|^2)$ by any standard algorithm.

Using the above procedure we separate E into the maximal number of subsets $\bar{E}_1, \ldots, \bar{E}_l$, such that $\forall 1 \leq i \neq j \leq l, \forall e' \in \bar{E}_i, \forall e'' \in \bar{E}_j$: e',e'' are independent. Note that pairwise independence generally does not imply the mutual independence. In our case it means $\bar{E}_1, \ldots, \bar{E}_l$, that is not necessarily a decomposition of E. We use however, $\bar{E}_1, \ldots, \bar{E}_l$, as a practical alternative to a true decomposition of E. In the remainder of this paper we will concentrate on detecting pairwise dependencies among the events.

Detection of Pairwise Dependencies

The definition of decomposability given in the previous section is based on the use of the distribution $\mu_E$ on the set of all event sequences. This makes it impossible to study decomposability of a single sequence. If we have a large set of observed sequences, we can form an approximation of $\mu_E$. Given a sufficiently long single sequence we can also obtain information about $\mu_E$. In the following subsection we describe the conditions under which this is the case.

Basic Assumptions

We expand our definitions a bit. Instead of considering event sequences over the finite interval $[T_s, T_e]$ of time, we (for a short while) consider infinitely long sequences $\tilde{s}$. Such sequence is a function $\tilde{s} Z \rightarrow \{0,1\}^{|E|}$, and (t) gives the events that happened at time t.

We assume that the event sequence is generated by some underlying stochastic process $\{Z_t\}_{t \in Z}$, where $Z_t$ is a random variable that takes values from $\{0,1\}^{|E|}$. In this formulation $F_E$ is a set of functions from Z into $\{0,1\}^{|E|}$, $F_E = \{Z(t) | Z(t): Z \rightarrow \{0,1\}^{|E|}\}$, and $\mu_E$ is a probability measure on $F_E$. Thus, the observed event sequence s is some specific realization $f(t) \in F_E$ restricted to the interval $[T_s, T_e]$.

First two assumptions that we introduce will permit to draw general conclusions from the single log, while the third assumption will allow us to restrict our attention to the local properties of the event generation process.

Assumption 1 (Stationary Process) The observed process is a stationary process, i.e., it is shift-independent:

$$\mu_E(S) = \mu_E(S_{+\tau}), \forall \tau \in Z, \forall S \subseteq F_E \text{ where } S_{+\tau} = \{f_{+\tau}(t) | \exists f \in S, s.t. \forall t \in Z: f_{+\tau}(t) = f(t+\tau)\}. \quad (8)$$

The assumption of stationary process means that process does not change over time. While this assumption by itself is somewhat unrealistic, in practice it can be easily justified by windowing, i.e., considering only a fixed sufficiently large time period. The question of stationary testing for a specific stochastic process is of great interest by itself, but it is beyond the scope of this paper.

Assumption 2 (Ergodic Process) The observed process is an ergodic process, i.e., statistics that do not depend on the time are constant. That is, such statistics do not depend on the realization of the process.

This is a very important assumption that means that any realization of the process is a representative of all possible runs. In particular it means that we can average by time instead of averaging different runs of the process.

Let X(f,u) denote the time average $$X(f, u) = \lim_{T \to \infty} (1/T) \int_{-T}^{T} f(u+t) dt. \quad (9)$$

where $f \in F_E$ is a particular realization (event-log). This random variable is time invariant. If the process is ergodic, then X is the same for all $f$, i.e., $X(f,u) \equiv \bar{X}$, and for a stationary process we have $$\bar{X} = E[X(f, u)] = \lim_{T \to \infty}(1/T) \int_{-T}^{T} E[f(u+t)] dt = \bar{f}. \quad (10)$$

where $\bar{f} = \bar{f}(t) = E[f(t)]$, so that the expected value in every point, $\bar{f}$, is equal to the time average $\bar{X}$.

Note that not every stationary process is ergodic. For example, a process that is constant in time is stationary, but it is not ergodic, since different realizations may bring different constant values.

The assumption of ergodicity is very intuitive in many natural systems, e.g., in telecommunications alarms monitoring. In such systems, we feel that logs from different periods are independent and are a good representative of the overall behavior of the system. This observation is also the basis for the next assumption.

Assumption 3 (Quasi-Markovian Process) The observed process is quasi-Markovian in the sense that local distributions are completely determined by the process values in some finite neighborhood, i.e.

$$p(Z_t \in D | Z_{t'}, t' \neq t) = p(Z_t \in D | Z_{t'}, t' \neq t, |t-t'| \leq \kappa) \quad (11)$$

where $D \subseteq \{0,1\}^{|E|}$ and $\kappa$ is some predefined positive constant, which is called maximal lag.

We call this assumption Quasi-Markovian in order to distinguish it from the classical definition of Markovian process where $\kappa=1$. We specify that local probabilities depend not only on the past, but also on the future to account for cases with lagged alarms and alarms that originate from unobserved joint source but have variable delay times.

Note that Markovian property does not say that random variables that are too far apart (i.e., lagged by more than $\kappa$ second) are independent. It simply says that the information that governs the distribution of some particular random variable is contained in its neighborhood, i.e., in order for one variable to have an influence on another over the maximum lag period this variable should 'pass' the influence information in time steps smaller than $\kappa$ seconds.

First Order Dependencies

The straightfoward way to detect pairwise dependencies among the events is by direct test of the pairwise independence condition. However, such approach is infeasible even for the simplest cases: Consider that two events are generated by stationary, ergodic and quasi-Markovian process with $\kappa=30$ seconds. In this case, we would like to approximate probabilities of the event distribution on some arbitrary 30 seconds interval (the start-time of the interval is unimportant since the process is stationary). This task will require approximation of probability of $2^{30}2^{30} \approx 10^{12}$ joint event sequences. Supposing that the average of 100 observations of each sequence are needed to approximate its true frequency one should observe the event generation process for about $10^{14}$ seconds, which is approximately 31 million years.

The example given above demonstrates that there is no feasible way to detect all possible event dependencies for arbitrary event generation process. For may inter-event dependencies, however, there is no need to compute the full probabilities of event distribution functions on interval $\kappa$, since the dependencies among the events are much more straightforward and are detectable by simpler techniques. For example, one event may always follow another event after a few seconds (see example on FIGS. 1, 2). Such dependency, called episode, is easily detectable.

This work deals with detection of event dependencies of first order. Such event dependencies can be described by specifying the expected density of events of one type in the neighborhood of events of second type. These neighborhood densities can usually be approximated with sufficient precision given the typical number of events (hundreds) in the data streams that we have encountered. Note also, that in the many applications the event streams are very sparse so it is reasonable to calculate densities in the neighborhood of events and not in the neighborhood of 'holes' (periods with no events occuring). Otherwise, the meaning of event and not-event may be switched.

Cross-Correlation Analysis

Consider two events $e_1$ and $e_2$. We observe a joint stochastic process that consists of two (possibly dependent) processes: one is generating events of type $e_1$ and second is generating events of type $e_2$. Consequently we have two streams of events $s_1$, $s_2$ of first and second event respectively. We can view $s_1$ and $s_2$ as a functions from the observed time period [1;T], (where T is the length of observation) into event frequencies, $\{0,1\}$. An example of such process is given on FIG. 3.

Supposing the quasi-Markovian property of the event generation process, the first order dependency should expose itself in the $2\kappa+1$ neighborhood of each event. We define the cross correlation with maximum lag $\kappa$ and with no normalization:

$$c_{12}(m) = \begin{cases} \sum_{n=1}^{T-m} s_1(n) s_2(n+m) & m \geq 0, \\ c_{21}(-m) & m < 0 \end{cases} \quad -\kappa \leq m \leq \kappa. \quad (12)$$

Note that the cross correlation vector $c_{12}$ is the reverse of $c_{21}$. By dividing $c_{12}$ by the observed frequencies of $e_1$ and $e_2$ we get the estimate of the neighborhood densities of $e_2$ in the neighborhood of $e_1$ and of $e_1$ in the neighborhood of $e_2$.

Ideally, if two events are unrelated and the length of observation (T) is sufficiently large, the average density in the event neighborhood should be the same as everywhere on the observed period. It is the same as to require that lagged cross-covariance is every zero, i.e., $$cov_{12}(m) = c_{12}(m)/(T-m) - p_1 p_2 = 0, \forall m \in [-\kappa, \kappa] \quad (13)$$

where $p_1$, $p_2$ are the a priori event probabilities, that does not depend on the time of observation since the process is supposed to be stationary. These probabilities can be estimated by averaging the observed frequencies of $e_1$ and $e_2$ over the length of the process (this is the direct usage of ergodicity assumption) i.e., let $\eta_1$, $\eta_2$ denote the observed number of events $e_1$ and $e_2$ respectively, thus $$p_1 \approx \eta_1/T$$

$$p_1 \approx \eta_2/T \quad (14)$$

In practice, the neighborhood densities are deviating from the expected values even if events are independent; this is due to the random nature of the event generation process and due to finite number of observations. Thus, we should introduce some model that will account for these effects and give us a threshold values, that will allow detection of the event dependencies that are beyond random phenomenon.

Modeling the Independent Event Generation Processes

Consider two independent, stationary stochastic processes that are generating events of types $e_1$ and $e_2$. We assume that the each event generation process is not autocorrelated, i.e., in each process the probability of event(s) occurring at any given time is independent on the nearby events. Such assumptions may be justified in the case of sparse, quasi-Markovian processes where the average distance between the events of the same type is large comparing to the maximum lag distance.

We are interested in computing the probability of encountering $c_{12}(m)=k$ for some particular m over the observed stream of length T. Since the event generation processes are assumed to be independent and stationary the above question is equivalent to calculating the probability of observing $c_{12}(0)=k$. We are also interested in computing the probability that $c_{12}(m)$ will not exceed some predefined values on the range $m\epsilon[-\kappa,\kappa]$. We formulate the following problem:
Problem 1 (Pairs Distribution) Assume we observe 2T independent binary random variables $s_1(t)$, $s_2(t)$ for $t=1, \ldots$ T, with $P(s_1(t)=1)=p_1$ and $P(s_2(t)=1)=p_2$ for all $t=1, \ldots, T$ Let $c_{12}$ be defined by Equation 12. The questions are:

What is the distribution of $c_{12}(0)$?

What is the exact form of $P(\forall m\epsilon[A,B], a \leq c_{12}(m) \leq b)$ for some given $\{A,B,a,b\}$?

We answer the first question exactly and give the approximation scheme for the second.

Under the assumptions of Problem 1 the generation of pair of events $e_1$ and $e_2$ is independent on its neighborhood and the probability of events $e_1$ and $e_2$ occurring together is $p_{12}=p_1 \cdot p_2$ where $p_1$, $p_2$ are a priori event probabilities. Thus the probability of observing exactly k pairs of events $e_1$, $e_2$ is described by binomial distribution:

$$P(c_{12}(0) = k) = \binom{T}{k} p_{12}^k (1 - p_{12})^{T-k} \qquad (15)$$

To assess the probability of observing a random phenomenon we would like to estimate the probability of obtaining more or equally extreme number of observations as k, i.e., $$R=P(\text{random phenomenon})=P(|c_{12}(0)-T \cdot p_{12}| \geq |k-T \cdot p_{12}|) \qquad (16)$$

Direct calculation of R may be a hard computational task, which is unnecessary since we can use one of the known approximations to binomial distribution, namely to approximate binomial distribution by Normal or Poisson distributions. Since the typical values of $p_{12}$ encountered in practice are very small (for the two most frequent events in telecommunications alarms data $p_{12}=1.6 \cdot 10^{-6}$) the Poisson approximation is more appropriate:

$$P(c_{12}(0) = k) \approx \frac{v^k e^{-v}}{k!}, v = T \cdot p_{12}. \qquad (17)$$

Thus the risk of accepting a random phenomenon with lag m as a true correlation is $$R(c_{12}(m) = k) \approx \sum_{i=k}^{T} \frac{v^i e^{-v}}{i!} \approx 1 - \sum_{i=0}^{k-1} \frac{v^i e^{-v}}{i!} \qquad (18)$$

The minimal extreme values are not considered by the above formula, since for the typical data we worked with the probability of observing zero pairs is quite large[1]. It is worth to mention that we have only observed T−m trials of the events lagged by m seconds, but T is usually much bigger than m so the error of assuming T trials is insignificant.

[1] The usage of particular approximation (Poisson or Normal), as well as, the usage symmetric or asymmetric risk calculations are dictated by particular application.

We approximate the probability of $c_{12}(m)$ to achieve the certain values on the range of $[-\kappa,\kappa]$ by assuming that $c_{12}(m)$ and $c_{12}(m')$ are independent for $m \neq m'$. We have:

$$P(\forall m\epsilon[-\kappa,\kappa], a \leq c_{12}(m) \leq b) \approx [P(a \leq c_{12}(0) \leq b)]^{2\kappa+1} \qquad (19)$$

Let $\delta$ denote the tolerable error probability of accepting two events as dependent, so threshold on the risk of each particular lagged correlation should be set as:

$$R_{th}=1-(1-\delta)^{1/(2\kappa+1)} \qquad (20)$$

EXAMPLE

Figure 3A:
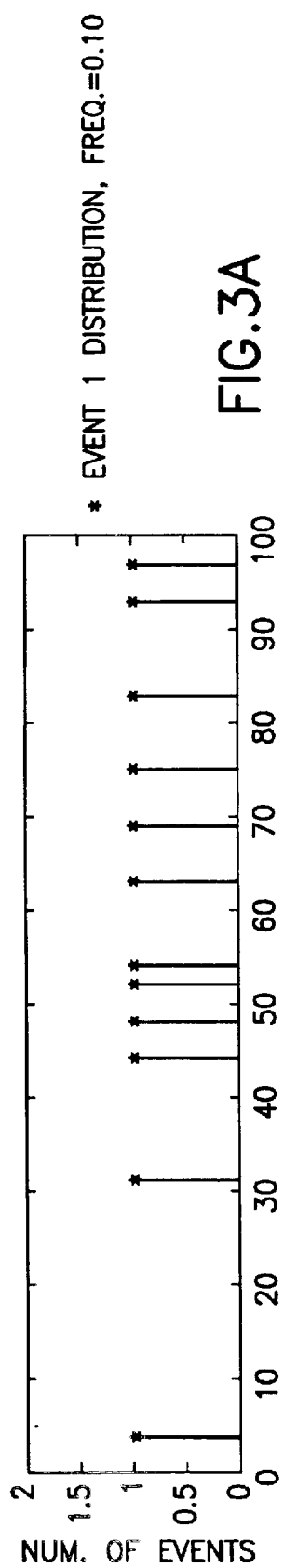
FIGS. 3A–3C are graphs of two independent event streams and their cross-correlation.
Figure 3B:
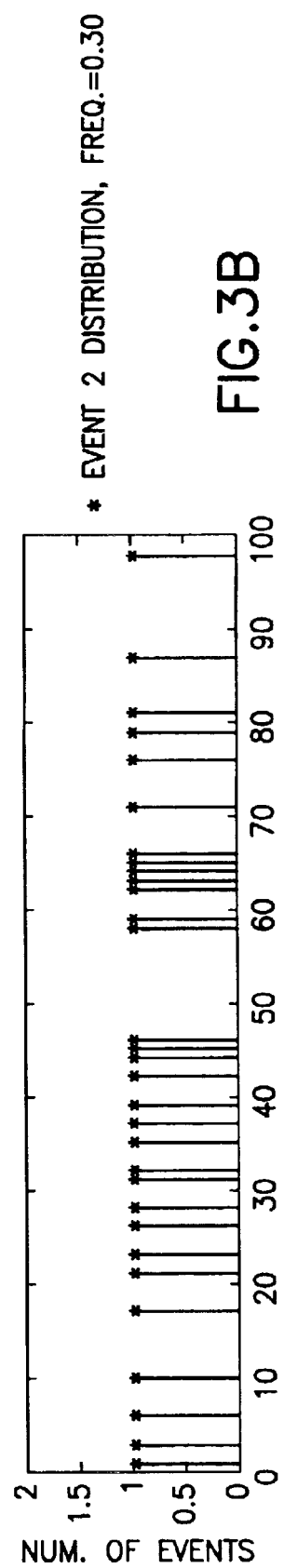
Figure 3C:

Consider two independent event streams shown on FIG. 3. We would like to know what is the random probability of the observed event: 'The maximum number of 7 pairs was encountered while analyzing lagged pairs, for lags in [−20, 20]'. Under the model described above the probability of observing 7 or more pairs for one particular lag is (assuming lag is much smaller than observation time):

$$P(\text{\# pairs} \geq 7 \mid \text{lag} = -17) \approx \sum_{i=7}^{100} \frac{3^i e^{-3}}{i!} = 0.0335. \qquad (21)$$

Thus, assuming the pair generation trials were independent, we have:

$$P(\text{\#pairs} \geq 7 \mid -20 \leq \text{lag} \leq 20) = 1-(1-0.0335)^{41}=0.7528. \qquad (22)$$

So the probability of observing 7 (or more) pairs in the analyzed lag interval [−20,20] is 75% for data in FIG. 3, thus these streams can not be considered dependent. □

In-Burst Event Independence Analysis

In many event sequences events tend to appear in bursts. Burst is a sudden increase of activity of the event generating process. For example in the telecommunications alarms data that we have analyzed, the mean inter-event distance is 68 seconds, the median is only 20 and maximal time between subsequent events is 3600 seconds (!). This data indicates that alarms in the telecommunication network data tend to appear in bursts with long intervals between them.

In burst-type event sequences, most of the events are dependent just because they are almost always grouped together. However, we may still want to perform in-burst analysis of event independence. Such analysis can be seen as deciding on the event independence given that events are grouped in bursts. Note that this model describes the situation when bursts are ignited by some external event and knowledge of these external events may rend many of the in-burst events independent.

To assess the risk of assuming the random phenomenon as true in-burst event dependence we would like to address the following problem, which is the generalization of Problem 1:

Problem 2 (Pairs Distribution, Non-Uniform density) Let $\eta_1$, $\eta_2$ be a positive constants and let $$\left[0, \frac{1}{\max(\eta_1 \eta_2)}\right] \quad D(t):\{1, \ldots T\} \to$$

be a function with integral one, i.e., $$\sum_{t=1}^{T} D(t) - 1.$$

We observe 2T independent binary random variables $s_1(t)$, $s_2(t)$ for $t=1, \ldots, T$, such that $P(s_1(t)=1)=\eta_1 D(t)$ and $P(s_2(t)=1)=\eta_2 D(t)$ for all $t=1, \ldots, T$. Let $c_{12}$ be defined by Equation 12. The questions are:

What is the distribution of $c_{12}(m)$?

How to estimate $P(\forall m\epsilon[A,B], a \leq c_{12}(m) \leq b)$ for some $\{A,B,a,b\}$?

This problem is illustrated on FIG. 4, where the two independent event streams are generated according to some a priori density D. Formally speaking, we assume two-stage event-generation process. First a subset G of $F_{e1, e2}$ is chosen such that expected event density is equal to D, i.e., $E_{f \in G} [f_{ei}] = \eta_1 D$ (for i=1, 2) and only then specific $f \in G$ is chosen. In this way the observed event streams are 'forced' to comply with some a priori event density D. We would like to find if $e_1$, $e_2$ are independent given D.

Simple In-Burst Event Dependence Analysis Scheme

The problem with the above approach lies in the estimation of a priori event density, which is too biased to the current realization of the random process. One way to overcome this difficulty, and introduce a more robust density approximation scheme, is to assume that D is of some fixed form, e.g., mixture of Gaussians. The simplest assumption is a 'binary' form of a priori distribution, i.e., the assumption that D specifies only 'yes' or 'no' information about bursts and in-burst event density is uniform.

An approach described in this section is based on the fact that events stream is very sparse, and there are usually long intervals between subsequent bursts. Many of the intervals are greater than the maximal lag time, and thus the event stream can be safely separated into a number of independent events subsequences that correspond to bursts and inter-burst intervals that are free from any events.

The standard 'uniform' analysis of is performed on the burst periods only, i.e., on the series of events that are separated by no-event intervals of length κ at least. Such analysis allows detecting first-order independent events given the bursts (but assuming nothing about burst magnitude). Technically, estimating the event probabilities $p_1$ and $p_2$ from bursts areas only gives larger estimates for $p_1$ and $p_2$ (Equation 14) thus rendering more of the found dependencies random comparative to the 'uniform' analysis.

The algorithm for such simplified in-burst event independence analysis is outlined below (step one is the same for all event pairs):

1. Remove all no-event intervals that are greater than κ seconds.
2. Calculate the lower limit on the number of observed lagged pairs for a given δ (Equation 18 and Equation 20) using the a priori event probabilities estimated from remaining data (Equation 14 with $T_{new}$=T−time (no-event-intervals)).
3. Calculate the observed number of pairs for each lag in [−κ,κ] and announce the events as dependent if the observed number of pairs for some lag exceeds the lower limit calculated on Step 2.

An Example of In-Burst Independence Analysis

As example, consider two event streams on FIG. 4. Performing the uniform random risk calculations (Section 3.4) without taking into account the distribution of events, we get the probability of 0.19% to observe correlation 10 or higher. On the over hand, removing the no-event areas and working only with about 50 seconds of observed bursts, we get 18% probability that the observed phenomenon is random.

This analysis shows that two events are clearly dependent in general, without considering an information about prior distribution. The in-burst analysis, however, demonstrates that these events are independent given the burst information.

Note, that this result is achieved under the very simple model, without even taking into account the actual form of event density. A natural extension may be to threshold the estimated a-priori density function at some over label (and not at zero, like in the above approach). This method will allow gradual adjustment of the event dependencies, from the events independent regardless to bursts to the events that are dependent even given the information that they occur together in some dense bursts (applying threshold on the estimated event density function at some high level).

Experimental Results

The empirical analysis of the proposed dependency detection methods was performed on the telecommunications alarm log data and on two synthetic datasets that were especially created to test the dependency detection algorithm. The data was analyzed using four dependency detection methods, as summarized below:

Event dependency analysis under uniform event generation model,

Event dependency analysis using only the yes/no burst information.

All algorithms were applied with maximum lag κ=300, and error probability threshold δ=0.01. Parameters of the episode detection algorithm are described in the corresponding sections.

Telecommunication Alarms Data

The telecommunications alarm log consists of 46662 alarms in telecommunication network logged over the period of one month (2626146 seconds). The alarms are of 180 different types and 27 alarms are occurring with relative frequency of more than one percent. The original data contains a number multiple events of the same time occurring in the same second. We suppress these multiple entries to allow only one event of each type in any particular second. This operation leaves 38340 events in the log, which correspond to 82 percent of the original data. The mean inter-event distance is about 68 seconds, while the median is only 20 indicating that events tend to group together in bursts.

We restrict our analysis to the ten most frequent alarms that are responsible for more than 51 percent of the alarm data. These alarms, occurring more than a thousand times each, are frequent enough to allow various meaningful statistical approximations. On the other hand, such restriction enables to follow algorithm behavior in detail and not to be overwhelmed by large amount of data and inter event relationships.

We perform analysis of pairwise event dependencies in four stages going from the most extensive set of dependencies detectable under no burst assumptions to the strongest and exclusive dependencies called episodes. The results are illustrated in FIG. 5.

We first analyze the telecommunications alarm data using the 'uniform' event generation model, i.e., without respect to the burst information. We demand random probability of the observed lagged correlation to be less than one percent and we are analyzing less than 5 minutes lags, i.e., δ=0.01, κ=300 and $R_{th} = 1-(1-0.01)^{1/601} \approx 1.67 \cdot 10^{-5}$. Pairwise event dependencies that were detected in this analysis are shown on FIG. 5a.

Figure 5B:
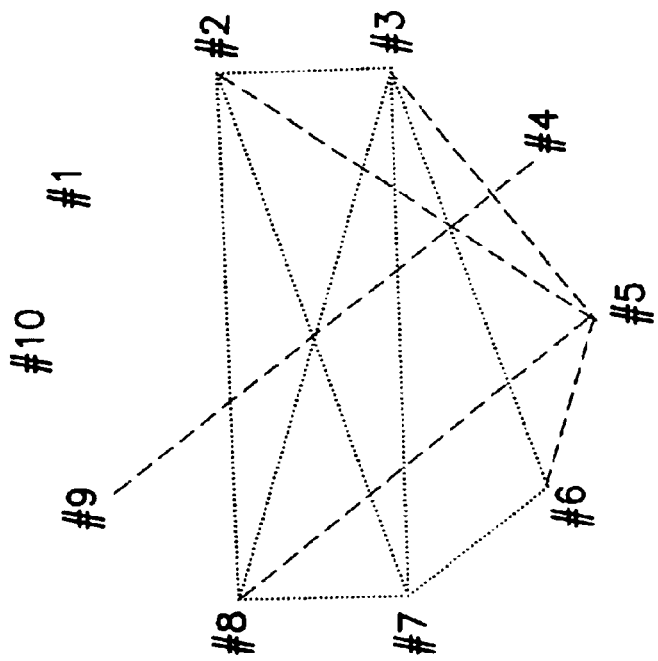
FIGS. 5A–5B are point graphs showing pairwise dependencies for the first ten most frequent events of sample telecommunications alarm data; error probability threshold is one percent ($\delta$=0.01)
Figure 5A:
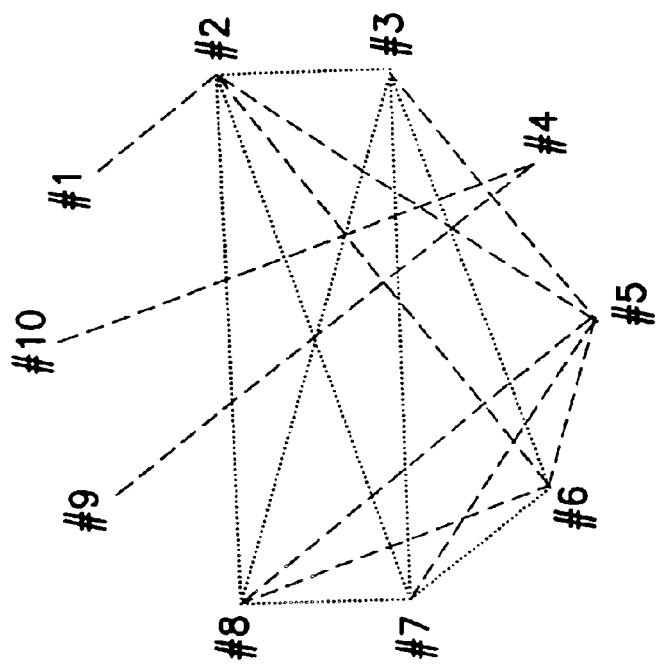

Removing the no-events intervals that are longer than κ=300 seconds and applying the dependencies detection technique with the same parameters we get fewer dependencies, as illustrated on FIG. 5b. The dependencies that are dropped are dependencies in pairs (2,6), (6,8) and, most noticeable, (1,2) and (4,10). Note that every in-burst dependency is also a dependency in the general sense.

Note that the set of inter-event dependencies consistently decreases as we restrict the definition of dependent events. FIGS. 5(a, b).

Experiments with Synthetic Data

We conduct additional experiments with two sets of synthetic data. The synthetic data streams contain events of five different types occurring over the period of 600000 seconds. The events frequencies are about 5000, 3000, 1000, 1000, and 100 in the observed streams. Two rules were applied during the generation of event streams.

Event #2 follows event #3 with 80% probability in time frame [95, 105] seconds.

Event #2 follows event #4 with 90% probability in time frame [8, 12] seconds.

All other events were generated independently.

The first data stream was generated with events appear uniformly over the whole time period, while the second data stream was generated according to a priori distribution, which consisted of uniform distribution plus 200 randomly located Gaussians with variances varying from 300 to 3600 seconds. These datasets are illustrated on FIG. 6.

The same pairwise dependency analysis techniques were applied on these synthetic datasets to test the performance and stability of the proposed dependency analysis methods. To support the consistency of the results the techniques were applied with exactly the same parameters as for the telecommunication alarms data, namely δ=0.01, κ=300 and density approximation by 30 seconds average of the observed event stream. The experimental results are shown in Table 5. In the first dataset, the only dependencies in pairs (2,3) and (2,4) are correctly detected by all methods, and all other pairs were announced independent.

In the second dataset, ignoring the burst information renders all of events to be dependent, and it is expected, since all the events are inherently dependent because they follow the same a priori distribution. The simple in-burst independence analysis, which takes only burst existence into account, also announces almost all (except (5, 1), (5, 2) and (5, 3)) of the events to be dependent. Possible source to that behavior can be even higher (comparing to telecommunications data) in-burst event density, since the median inter-event distance is only 2 seconds, comparing with 20 for telecommunications data, while the mean inter-event distances are about the same (60 and 68 seconds respectively).

To summarize,

All independent events are reported as independent, with error probability δ.

All first order pairwise event dependencies are found, with probability 1−δ.

Some of the independent pairs reported may have dependency of higher order (undetectable by first order methods).

As a negative example of the dependencies that can not be found by analysis of first order moments imagine that first event has a priori density of 2 events per maximal lag (κ) and is distributed uniformly everywhere except the κ seconds after occurrences of second event (which is, suppose, much sparsely distributed). Suppose also, that after each event of second type there are always two events of first type in time frame of κ seconds and they are always separated by p or κ−p seconds. While the distributions of these two events are clearly dependent this fact can not be detected by analyzing the neighborhood event densities of first event around second event and vice versa.

The present methods can be extended to treat second-order dependencies, i.e., second-order moments of the distribution of one event in the neighborhood of another. One should be careful, however, to ensure that he has enough data to make a sufficient estimation of the measured quantities. This may be possible in the independent component analysis of the usual, non-sequential data, e.g., market basket data. In a market basket data all 'events' (purchases) in the dataset happen in the same time and we have multiple observations of the same variables (the set of all available goods). Removing the additional time variable may permit investigation of the higher order dependencies by approximating higher order moments with sufficient precision. It also may allow analysis of more complex, non-pairwise dependencies.

TABLE 5

Experimental results with synthetic data. Found dependencies shown for each pairwise dependency detection method.

| Event dependence analysis | Uniform density | Burst-like density |
|---|---|---|
| Uniform event generation model | (2, 3), (2, 4) | Every pair. |
| Yes/No burst information | (2, 3), (2, 4) | Almost every pair. |
| Burst density approximation | (2, 3), (2, 4) | (2, 3), (2, 4), (1, 2). |
| Episodes detection | (3→2), (4→2) | (3→2), (4→2). |

In a preferred embodiment the underlying event-generation process is stationary, i.e., does not change over time, ergodic, and a quasi-Markovian property of the observed process; i.e., the distribution of events in the particular time frame depends only on some finite neighborhood of this frame.

It will be appreciated that considerable advantages are achieved with the present invention when compared with solutions of prior art. A system and method operating according to features of the present invention, as contrasted to known methods, avoids a full search in the space of slices of event sequences by doing first a search in the k-dimensional Euclidian space. This approach has low computational complexity, which is linear in the size of the data. It will also be recognized, that the amount of memory storage during the prior art edit computations can be made smaller by using features of the invention. In addition, the computational time will be less using the method described in the present invention. Also, with lower computational time demands, simpler and cheaper processors can be utilized with the present invention but still achieving reasonable processing speed.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A processor-implemented method for determining similarity between a first event set, the first event set comprising a first plurality of event types, and a second event set, the second event set comprising a second plurality of event types, the method comprising the steps of:

randomly mapping the first event set to a multidimensional vector Q;

randomly mapping the second event set to a multidimensional query vector q; and determining similarity of the multidimensional vector Q with the multidimensional query vector q according to:

$\|Q-q\| \le SV$, where $SV$=a predetermined similarity value.

2. A method as in claim 1 wherein the step of randomly mapping the first event set to a multidimensional vector Q comprised of dimensions j=1 . . . k, where k is predetermined, further comprises the steps of:

determining a first weighting function; and for each dimension j=1 . . . k:

determining a first set of dimensional random variables for each event type within the first plurality of event types;

weighting each of the first set of dimensional random variables corresponding to each event type occurring within the first event set with the first weighting function; and summing each of the weighted random variables.

3. A method as in claim 2 wherein the step of determining the first weighting function further comprises the step of determining a first linear weighting function.

4. A method as in claim 2 wherein the step of determining the first weighting function further comprises the step of determining a first exponential weighting function.

5. A method as in claim 2 wherein the step of determining the first set of dimensional random variables further comprises the step of determining a first set of normally distributed random variables.

6. A method as in claim 1 wherein the step of randomly mapping the first event set to a multidimensional vector q further comprises the steps of:

determining a second weighting function; and for each dimension $j_2=1 \ldots k_2$, where $k_2$ is predetermined:

determining a second set of dimensional random variables for each event type within the second plurality of event types;

weighting each of the second set of dimensional random variables corresponding to each event type occurring within the second event set with the second weighting function; and summing each of the weighted random variables.

7. A method as in claim 6 wherein the step of determining the second weighting function further comprises the step of determining a second linear weighting function.

8. A method as in claim 6 wherein the step of determining the second weighting function further comprises the step of determining a second exponential weighting function.

9. A method as in claim 6 wherein the step of determining the second set of dimensional random variables further comprises the step of determining a second set of normally distributed random variables.

10. A method as in claim 1 wherein the first plurality of event types comprises:

at least one first dependent event type; and at least one first independent event type.

11. A method as in claim 1 wherein the second plurality of event types comprises:

at least one second dependent event type; and at least one second independent event type.

12. A processor-implemented method of finding a query-subset of events within an event set, the event set comprising a stream of ordered events, each ordered event corresponding to an event type e from a set of event types E, the method comprising the steps of:

dividing the stream of ordered events into a plurality of segments;

mapping each of the plurality of segments to a corresponding dimensional segment-vector;

mapping the query-subset of events to a dimensional query-vector; and comparing the dimensional query-vector with at least one of the dimensional segment-vectors, and as a result of the comparison, making a determination whether the dimensional query-vector is similar to the compared segment-vector.

13. A method as in claim 12 wherein the step of mapping each of the plurality of segments to a corresponding dimensional segment-vector further comprises the steps of:

determining a first weighting function;

determining a random variable $r(e,j)$ for each event type e for each dimension $j=1 \ldots, k$, where k is predetermined;

for each dimension j:

weighting the random variable $r(e,j)$ for the event type corresponding to each event within the segment with the first weighting function to form a first group of dimension dependent weighted events; and summing each of the dimension dependent weighted events within the first group.

14. A method as in claim 13 wherein the step of determining the first weighting function further comprises the step of determining a first linear weighting function.

15. A method as in claim 13 wherein the step of determining the first weighting function further comprises the step of determining a first exponential weighting function.

16. A method as in claim 13 wherein the step of determining the random variable $r(e,j)$ further comprises the step of determining a normally distributed random variable.

17. A method as in claim 13 wherein the step of mapping the query-subset of events to a dimensional query-vector further comprises the steps of:

determining a second weighting function;

for each dimension j:

weighting the random variable $r(e,j)$ for the event type corresponding to each event within the query-subset of events with the second weighting function to form a second group of dimension dependent weighted events; and summing each of the dimension dependent weighted events within the second group.

18. A method as in claim 17 wherein the step of determining the second weighting function further comprises the step of determining a second linear weighting function.

19. A method as in claim 17 wherein the step of determining the second weighting function further comprises the step of determining a second exponential weighting function.

20. A processor-implemented method for finding similar situations in sequences of events in a data flow, the method comprising the steps of:

mapping, using a random projection, slices of a sequence of events to multidimensional (k) vectors and mapping a query sequence of events to a multidimensional (k) query vector;

searching among the vectors for such multidimensional vectors for which the distance from the query vector is small;

for each slice corresponding to a found vector verifying its similarity to the query sequence; and producing as a result a set of slices that are similar to the query sequence.

21. A method according to claim 20, further comprising the steps of:

logging the sequences of events in the data flow over a period of time;

comparing the logged sequences of events with current data in the data flow; and using the comparison results in predicting future events in the data flow.

22. A method according to claim 20 further comprising the steps of:
    logging the sequences of events in the data flow over a period of time;
    detecting regularities in the sequences of the data flow; and
    using the detected regularities in producing individual services or interfaces.

23. A method according to claim 20, further comprising the steps of:
    logging the sequences of events in the data flow over a period of time;
    statistically analysing the events in the sequences of the data flow; and
    using the statistical information in producing added value to applications and services.

24. A method according to claim 20 wherein the sequences of events of the data flow comprise time series data, including sequences of events with their corresponding occurrence times in a telecommunications network.

25. A method according claim 20 wherein the sequences of events of the data flow comprise data arising from mobile services with request being made by mobile subscribers or from user interface studies where users manipulate a device through an interface or data arising from financial or scientific applications, such as stock price indices, the volume of product sales, telecommunication data, medical signals, audio data or environmental measurement sequences.

26. A method according to claim 20 wherein the sequences of events of the data flow comprise ordered data objects or events with a defined relative order, the relative order of the data objects or events defined as their occurrence time.

27. A method according claim 20, wherein the slices comprise subsets of the sequence, defined as the subsequence of events occurring in a defined time interval.

28. A method according claim 20 wherein the query sequence comprises a sequence of events, defined as a sequences of events for which the occurrence times are within a defined time interval.

29. A method according to claim 20 wherein the mapping using random projections comprises a mathematical random projection from sequences of events to a multidimensional (k) space, the random projection having the property of small expected distance between vectors mapped from similar sequences and a larger expected distance between vectors mapped from dissimilar sequences.

30. A method according to claim 20 wherein the searching further comprises the step of linear searching.

31. A method according to claim 20 wherein the searching further comprises the step of advanced data structure searching.

32. A method according to claim 20 wherein the distance between vectors comprises the norm of the difference between the vectors.

33. A method according to claim 20, wherein the step of the verification comprises the step of applying edit distance computation for establishing similarity between slices and the query sequence.

34. A system for finding a query-set of events within a master-set of observed events, wherein the events belong to an event set E, the system comprising:
    a k-dimension random variable generator for generating random variables for each event within the event set E for each $j=1 \ldots k$ dimensions, where k is predetermined;
    an observed event segmenter for segmenting the master-set of observed events to produce a plurality of observed event segments, $(d_{11},s_{11} \ldots d_{1m},s_{1m}) \ldots (d_{h1},s_{h1} \ldots d_{hm}, s_{hm})$, where d=segmented observed event, and s=a parameter associated with the observed event;
    a weighting function generator for generating a weighting function;
    an observed event vectorizer for vectorizing each observed event segment $(d_{11},s_{11} \ldots d_{1m}, s_{1m}) \ldots (d_{h1},s_{h1} \ldots d_{hm},s_{hm})$ according to the weighting function and the dimensional random variable corresponding to the segmented observed event d and dimension k;
    a query event vectorizer for vectorizing the query set of events $(Qe_1, Qs_1 \ldots Qe_w,Qs_w,)$ according to the weighting function, the dimensional random variable corresponding to a query event Qe, and dimension k, wherein Qs=a parameter associated with the query event Qe; and
    a comparator for comparing the vectorized query-set of events with each vectorized observed event segment and generating the observed event segment in accordance with the comparison results and predetermined similarity factors.

35. A system as in claim 34 wherein the k-dimension random variable generator further comprises a k-dimension normally distributed random variable.

36. A system as in claim 34 wherein the master-set of observed events comprises a master-set of time ordered events.

37. A system as in claim 34 wherein the s parameter comprises a time parameter associated with the observed evented.

38. A system as in claim 34 wherein the weighting function generator comprises a linear weighting function generator.

39. A system as in claim 34 wherein the weighting function generator comprises an exponential weighting function generator.

40. A system as in claim 34 wherein the weighting function generator comprises a look-up-table.

41. A system as in claim 34 wherein the system further comprises an observed event data preconditioner for segmenting observed event data into at least one dependent observed event data segment or at least one independent observed event data segment.

42. A system as in claim 34 wherein the system further comprises a query event data preconditioner for segmenting query event data into at least one dependent query event data or at least one independent query event data.

43. A system as in claim 34 wherein the system further comprises a query event data preconditioner for statistically analyzing the query event data and segmenting the query event data according to the results of the statistically analyzed query event data.

44. A system as in claim 43 wherein the system further comprises a observed event data preconditioner for preconditioning the observed event data according to the results of the statistically analyzed query event data.

45. A system as in claim 34 wherein the system further comprises an observed event data preconditioner for statistically analyzing the observed event data and segmenting the observed event data according to the results of the statistically analyzed observed event data.

46. A system as in claim 34 wherein the parameter Qs associated with the query event Qe further comprises a time parameter.

47. A system as in claim 46 wherein the query set of events further comprises a time ordered set of events according to the associated parameter Qs.

48. A program storage device readable by a machine, tangibly embodying a program of instructions executable by the machine to perform method steps determining similarity between a first event set, the first event set comprising a first plurality of event types, and a second event set, the second event set comprising a second plurality of event types, the method comprising the steps of:

mapping the first event set to a multidimensional vector Q;

mapping the second event set to a multidimensional query vector q; and determining similarity of the multidimensional vector Q with the multidimensional query vector q according to:

$\|Q-q\| \leq SV$, where $SV$=a predetermined similarity value.

* * * * *